United States Patent
Kamatani et al.

(10) Patent No.: US 6,906,875 B2
(45) Date of Patent: Jun. 14, 2005

(54) MAGNETIC TRANSFER DEVICE

(75) Inventors: Akito Kamatani, Kanagawa-ken (JP); Masakazu Nishikawa, Kanagawa-ken (JP); Makoto Nagao, Kanagawa-ken (JP); Kazunori Komatsu, Kanagawa-ken (JP); Tsuneo Inui, Kanagawa-ken (JP); Kazuhiro Niitsuma, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 296 days.

(21) Appl. No.: 10/144,024

(22) Filed: May 14, 2002

(65) Prior Publication Data

US 2003/0002182 A1 Jan. 2, 2003

(30) Foreign Application Priority Data

| May 15, 2001 | (JP) | 2001-144295 |
| May 30, 2001 | (JP) | 2001-162367 |
| Jun. 19, 2001 | (JP) | 2001-184973 |
| Jun. 27, 2001 | (JP) | 2001-194834 |
| Jul. 25, 2001 | (JP) | 2001-224508 |
| Sep. 28, 2001 | (JP) | 2001-302229 |

(51) Int. Cl.$^7$ .............................................. G11B 5/86
(52) U.S. Cl. ........................... 360/17; 360/15; 360/16
(58) Field of Search ........................ 360/15–17, 133, 360/137; 428/692, 694 T

(56) References Cited

U.S. PATENT DOCUMENTS

| 3,721,775 | A | * | 3/1973 | Fujimoto et al. | 360/17 |
| 3,947,872 | A | * | 3/1976 | Asai | 360/16 |
| 4,047,230 | A | | 9/1977 | Kume et al. | |
| 6,469,848 | B1 | * | 10/2002 | Hamada et al. | 360/17 |
| 6,606,208 | B2 | * | 8/2003 | Ishida et al. | 360/17 |
| 6,665,133 | B1 | * | 12/2003 | Hashi et al. | 360/17 |

OTHER PUBLICATIONS

Japanese Abstract No. 2001351235, dated Dec. 21, 2001.
Japanese Abstract No. 05081671, dated Apr. 2, 1993.
Japanese Abstract No. 56041509, dated Apr. 18, 1981.

* cited by examiner

Primary Examiner—David Hudspeth
Assistant Examiner—Natalia Figueroa
(74) Attorney, Agent, or Firm—Sughrue Mion, PLLC

(57) ABSTRACT

A magnetic transfer device for bringing a master carrier with information and a slave medium into intimate contact with each other and then applying a transfer field to transfer the information to the slave medium. The master carrier has an inclined face on its radially outer end. After the magnetic transfer of the information, claws are inserted in the gas formed by the inclined face of the master carrier and the slave medium. The slave medium held in intimate contact with the master carrier is separated from the master carrier by lifting the slave medium with the claws.

20 Claims, 12 Drawing Sheets

MAGNETIC TRANSFER DEVICE

BACKGROUND OF THE INVENTION

1. Field of the Invention

The present invention relates to a magnetic transfer device for magnetically transferring information carried by a master carrier to a slave medium, and more particularly to the structure of separating the slave medium from the master carrier after magnetic transfer.

2. Description of the Related Art

In magnetic transfer, a master carrier with a "land/groove" pattern (magnetic material) corresponding to information (e.g., a servo signal) is brought into intimate contact with a slave medium having a magnetic recording portion to which the information is transferred. In this state, a magnetic field for transfer (hereinafter referred to as a transfer field) is applied, and a magnetization pattern corresponding to the information carried by the master carrier is transferred and recorded on the magnetic recording portion of the slave medium. Such a magnetic transfer method is disclosed, for example, in Japanese Unexamined Patent Publication Nos. 63(1988)-183623, 10(1998)-40544, and 10(1998)-269566.

The aforementioned magnetic transfer is serially performed on a plurality of slave mediums by employing a single master carrier. Initially, the master carrier is arranged in a magnetic transfer device, and a slave medium is conveyed to a position where it is brought into intimate contact with the master carrier. After the slave medium and the master carrier are brought into intimate contact with each other, a transfer field is applied to perform magnetic transfer. After the magnetic transfer, care must be taken when separating and removing the slave medium from the master carrier that they are not scored.

Particularly, during magnetic transfer, air is drawn from the contact surface between the slave medium and the master carrier to hold them in intimate contact with each other. Because of this, there are cases where the slave medium sticks fast to the master carrier after transfer. Since the sticking force is great, it is fairly difficult to separate the slave medium from the master carrier. When the slave medium and the master carrier are separated, there is a possibility that they will be scored. In addition, the separating operation is time-consuming and therefore reduces productivity.

The slave medium can be separated from the master carrier, by shifting the slave medium in the direction of the slave medium plane with respect to the master carrier after magnetic transfer, then projecting the edge of the slave medium from the edge of the master carrier, and chucking the projected portion. However, when shifting the slave medium with respect to the master carrier, there is a possibility that the master carrier and the slave medium will rub against each other and therefore they will be scored. If the master carrier is scored, it will cause poor magnetic transfer. If the slave medium is scored, it will result in a detective product.

In addition, the slave medium in intimate contact with the master carrier after magnetic transfer can be separated from the master carrier by sucking and holding the slave medium with the suction pad used in conveying the slave medium to the master carrier. However, in the case where the contact force between the master carrier and the slave member is strong, the separating force is insufficient, or there is a possibility of damaging the slave medium. Furthermore, the master carrier and the slave medium can be mechanically separated, or they can be separated by applying pressurized air to the contact surface therebetween.

However, even if the slave medium is separated from the master carrier, they will again stick to each other, unless the separated state is maintained. As a result, conveying becomes difficult.

In addition, in the aforementioned magnetic transfer method, if a transfer pattern (information) on the master carrier is magnetically transferred and recorded with the master carrier and the slave medium held in intimate contact, there are cases where the size and position of a magnetization pattern recorded on the slave medium differ from those of the transfer pattern (information) on the master carrier and therefore errors occur. The number of errors due to the pattern size fluctuation and positional shift varies with the position of the slave medium and the transferring time. However, the cause of the pattern size fluctuation has not been specified. In the case where there is a great fluctuation in the pattern size, for example, the tracking function cannot be sufficiently obtained if the signal recorded magnetically on the slave medium is a servo signal. As a result, reliability is reduced.

After magnetic transfer is repeated a large number of times, the master carrier surface is degraded. This degradation causes defects to occur in the signals recorded on the slave medium and considerably reduces the quality of transferred signals.

As indicated in experiments that is to be described later, magnetic transfer has been performed under various conditions with respect to the quality of transferred signals and it has been found that the temperature in the magnetic transfer step has a strong influence on a difference in pattern size between the master carrier and the slave medium before and after magnetic transfer. For example, the master carrier has an internal strain, which is not isotropic but anisotropic. Because of this, if ambient temperature changes, the anisotropy will cause distribution to occur in the amount of strain. Because of the distributed strain, local position shift occurs in both the transfer pattern on the master carrier and the magnetization pattern recorded on the slave medium and causes errors.

On the other hand, it has been found that missing signals, which occur in repeating magnetic transfer, occur due to contamination resulting from dust particles on the contact surface between the master carrier and the slave medium. The contamination has been analyzed and it has been found that there are roughly two kinds. One kind is due to the interposition of a metallic oxide. Basically, a metallic oxide is present on the master carrier surface, and it is the oxide of the magnetic layer material of the master carrier. Another kind is due to the interposition of ordinary dust particles, and a large number of dust particles are present on the slave medium surface. Furthermore, the two kinds of contamination vary with the weather and season when magnetic transfer is performed. Hence, investigations have been made with respect to the correlation between the contamination occurrence period and the environmental temperature and humidity, and it has been observed that there is a strong correlation between the contamination and the environmental humidity. In a low humidity environment a large number of ordinary dust particles are present, and in a high humidity environment the local oxide of the magnetic layer of the master carrier seems to occur frequently, although it is not a problem in appearance. It has also been found that a large number of dust particles adhere to the slave medium during conveyance, because static electricity is easily generated under a condition of low humidity. Furthermore, it has also been found that under a condition of high humidity, dew condensation occurs on the magnetic layer surface of the master carrier and oxides the magnetic layer surface, and that the oxide falls off the surface. Since most of the oxidized places occur at the acute-angle portions in a pattern formed on the master carrier, dew condensation under high humidity occurs at the acute-angle portions of the pattern, and consequently, the master carrier is selectively oxidized. Since the master carrier is partially oxidized, a difference in stress occurs between the oxidized portion and the unoxidized portion and therefore oxidized regions come off.

SUMMARY OF THE INVENTION

The present invention has been made in view of the problems mentioned above. Accordingly, it is the primary object of the present invention to provide a magnetic transfer device that is capable of performing magnetic transfer whose productivity is high, by safely and efficiently separating a slave medium from a master carrier after magnetic transfer.

To achieve this end, there is provided a first magnetic transfer device for bringing a master carrier, which has information and recess means, and a slave medium into intimate contact with each other and then applying a transfer field to transfer the information to the slave medium, the magnetic transfer device comprising:

separation means for applying external force to the slave medium being held in intimate contact with the master carrier through the recess means formed in the master carrier to separate the slave medium from the master carrier.

In the first magnetic transfer device, the recess means of the master carrier comprises an inclined face or inclined faces formed on the radially outer edge of the master carrier, a groove or grooves formed in the radially outer edge, or cutouts formed in the radially outer edge. The aforementioned separation means comprises one or more claws that are inserted into a gap, or gaps, formed by the recess means and the slave medium. The slave medium in intimate contact with the master carrier is separated by lifting the slave medium with the one or more claws.

In the first magnetic transfer device, the recess means of the master carrier may comprise recesses formed in the radially outer edge of the master carrier, or grooves formed in the radially outer edge. The aforementioned separation means may comprise one or more injection nozzles that are inserted into a gap, or gaps, formed by the recess means and the slave medium. In this case, the slave medium in intimate contact with the master carrier is separated by injecting compressed air into the gap or gaps through the one or more injection nozzles.

In addition, the aforementioned recess means may comprise through bores or cutouts formed in the portion of the master carrier where a transfer pattern is not formed. The aforementioned separation means may comprise pins that are inserted into the recess means (through bores or cutouts). In this case, the slave medium in intimate contact with the master carrier is separated by pushing up the slave medium with the pins.

Furthermore, the aforementioned recess means of the master carrier may comprise through bores formed in the portion of the master carrier where a transfer pattern is not formed, and the aforementioned separation means may comprise injection nozzles that are communicated with the through bores. In this case, the slave medium in intimate contact with the master carrier is separated by injecting compressed air into the through bores through the injection nozzles.

In accordance with the present invention, there is provided a second magnetic transfer device for bringing a master carrier with information and a slave medium into intimate contact with each other and then applying a transfer field to transfer the information to the slave medium, the magnetic transfer device comprising:

separation means for applying pressurized air to a radially inner contact surface between the master carrier and the slave medium.

In the second magnetic transfer device, the master carrier has air introducing passages formed in its radially inner end portion which makes intimate contact with the slave medium.

In the second magnetic transfer device, the separation means may comprise a small-diameter air passage formed in a center shaft which is inserted into a center hole of the master carrier and a center hole of the slave medium, and branch passages extending from the air passage to the radially inner contact surface between the master carrier and the slave medium. In this case, if pressurized air is supplied to the air passage, it is supplied to the air introducing passages formed in the radially inner end portion of the master carrier which makes intimate contact with the slave medium. Therefore, the master carrier and the slave medium can be easily separated from each other.

In the second magnetic transfer device, the air passage can also be used as a vacuum discharge passage for drawing air from the contact surface between the master carrier and the slave medium to bring them into intimate contact with each other.

If the pressurized air is passed through a HEPA filter and undergoes an ionization process, it can also be used as clean air. In addition, if the pressurized air is low-temperature gas such as $CO_2$ gas, etc., organic dust particles adhering to the contact surface between the master carrier and the slave medium can be frozen quickly and discharged along with a flow of air.

In the second magnetic transfer device, the aforementioned air introducing passages are formed into the shape of a wedge-shaped recess. The air introducing passages may be formed into the shape of a groove so that the pressurized air can be easily introduced into the gaps between the slave medium and the air introducing passages of the master carrier. The air introducing passages are provided at two or more diagonal positions, or three or more positions equally spaced, so that they do not interfere with the aforementioned transfer pattern.

The air introducing passages may be formed by inserting a shim (thin plate, non-adhesive tape, etc.) of thickness 5 to 50 $\mu$m into a gap between the master carrier and the slave medium. The master carrier has a land/groove pattern (magnetic material) corresponding to information which is transferred. The master carrier is generated as follows. For example, a substrate with a land/groove pattern is formed by a stamper generation method of forming a thin metal film on the land/groove pattern of an original plate by a metal film forming method (electrotyping, etc.), and the land/groove pattern of the substrate is coated with a soft magnetic material. In the case where the aforementioned air introducing passages are provided, it is preferable that they be formed when the substrate is formed. It is also preferable that the slave medium be a disk-shaped magnetic recording medium such as a hard disk, a flexible disk, etc. In the case where the slave medium is a flexible disk, separation means employing compressed air is preferable.

As a magnetic field application device for applying a transfer field, electromagnets or permanent magnets are adopted. The transfer field is applied to one side or both sides of the contact portion between the master carrier and the slave medium. In the case where the transfer field is applied to a portion of the contact body of the master carrier and the slave medium, magnetic transfer is performed on the entire surface by moving either the contact body or the transfer field.

When performing magnetic transfer, the slave medium is magnetized in one direction (in-plane direction or perpendicular direction). Next, the slave medium is brought into intimate contact with the master carrier, and in this state, a transfer field is applied in the opposite direction from the direction of the initial magnetization to perform magnetic transfer. It is preferable that the aforementioned information be a servo signal.

In accordance with the present invention, there is provided a third magnetic transfer device for bringing a master carrier with information and a slave medium into intimate contact with each other and holding them in a holder, and then applying a transfer field to transfer the information to the slave medium, the magnetic transfer device comprising:

a separating member, installed in the holder so that it is axially movable, which comprises a first shaft portion engaging with a center hole of the master carrier, a second shaft portion smaller in diameter than the center hole of the master carrier and engaging with a center hole of the slave medium, and a stepped portion formed between the first shaft portion and the second shaft portion;

wherein the separating member is axially moved after magnetic transfer so that the slave medium is separated from the master carrier and held by the stepped portion.

In the third transfer device, the separating member maybe constructed with an end portion of a center shaft installed in the center portion of the holder so that it is axially slidable. In this case, it is preferable that the aforementioned center hole be formed when the substrate is formed.

In accordance with the present invention, there is provided a magnetic transfer method comprising:

a conveyance step of conveying a slave medium;

a contact step of bring the slave medium and a master carrier into intimate contact with each other;

a magnetic field application step of applying a transfer field to the slave medium and the master carrier being held in intimate contact with each other; and a separation step of separating the master carrier and the slave medium from each other;

wherein during at least the contact step, the magnetic field application step, and the separation step, environmental temperature is controlled in the range of 10 to 60° C. and relative humidity is controlled in the range of 10 to 80 RH %.

In the magnetic transfer method, it is preferable that the environmental temperature be controlled in the range of 15 to 45° C. It is also preferable that the relative humidity be controlled in the range of 35 to 70 RH %.

In the environmental temperature range and the relative humidity range, a ratio ($\alpha S/\alpha M$) of a thermal linear expansion coefficient ($\alpha M$) for the master carrier and a thermal linear expansion coefficient ($\alpha S$) for the slave medium is in the range of 0.5 to 40.

In the aforementioned conveyance step, the number of dust particles (with particle sizes 0.3 μm or smaller) per cubit feet (=$28.32 \times 10^{-3} m^3$) is 100 or less and the number of dust particles (with particle sizes of 0.5 μm or larger) is zero. In addition, it is preferable to remove dust particles adhering on the surface of the slave medium before it is brought in intimate contact with the master carrier.

In performing magnetic transfer, the slave medium is magnetized in one direction (in-plane direction or perpendicular direction). Next, the slave medium is brought into intimate contact with the master carrier, and in this state, a transfer field is applied in approximately the opposite direction from the direction of the initial magnetization to perform magnetic transfer.

In the aforementioned magnetic transfer, there are single-sided serial transfer and double-sided simultaneous transfer. The single-sided serial transfer is performed with the master carrier held in direct contact with one side of the slave medium. The double-sided simultaneous transfer is performed with two master carriers held in direct contact with both sides of the slave medium. In the single-sided serial transfer, a magnetic field application device is arranged on one side and a transfer field is applied. In the double-sided simultaneous transfer, two magnetic field application devices are arranged on both sides and a transfer field is applied. In the case of in-plane recording, the magnetic field application device generates a magnetic field in a direction parallel to the direction of a data track in approximately the opposite direction from the direction of the initial magnetization. In the case of perpendicular recording, it generates a magnetic field in a direction perpendicular to the slave medium plane. In the case where a magnetic field is applied to a portion of the slave medium, a magnetization pattern is transferred to the entire surface of the slave medium by moving either the contact body of the slave medium and the master carrier or the magnetic field.

According to the magnetic transfer method of the present invention, the slave medium has a magnetic recording portion to which a magnetization pattern, for example, a servo signal corresponding to the transfer pattern on the master carrier has been transferred accurately under the aforementioned environmental conditions.

According to the present invention, the aforementioned first magnetic transfer device is equipped with a master carrier having recess means, and separation means for applying external force to the slave medium being held in intimate contact with the master carrier through the recess means to separate the slave medium from the master carrier. With this constitution, the slave medium after magnetic transfer can be easily separated from the master carrier without scoring the master carrier and the slave medium. Thus, productivity can be enhanced and the life of the master carrier can be lengthened.

According to the present invention, the aforementioned second magnetic transfer device is equipped with separation means for applying pressurized air to a radially inner contact surface between the master carrier and the slave medium. In addition, in the second magnetic transfer device, the master carrier has air introducing passages formed in its radially inner end portion which makes intimate contact with the slave medium. With this arrangement, pressurized air can be easily introduced to the contact surface between the slave medium and the master carrier. Therefore, stable and quick separation of the slave medium and the master carrier can be performed, and at the same time, dust particles can be removed from them.

According to the present invention, the aforementioned third magnetic transfer device is equipped with a separating member, installed in the holder so that it is axially movable, which comprises a first shaft portion engaging with a center hole of the master carrier, a second shaft portion smaller in diameter than the center hole of the master carrier and engaging with a center hole of the slave medium, and a stepped portion formed between the first shaft portion and the second shaft portion. In addition, the separating member is axially moved after magnetic transfer so that the slave medium is separated from the master carrier and held by the stepped portion. With this constitution, stable and quick separation of the slave medium and the master carrier can be performed, and in the separated state, the slave medium can be held. Therefore, there is no possibility that the slave medium will make intimate contact with the master carrier again. Thereafter, the slave medium can be easily removed from the master carrier, and consequently, the next slave medium and the master carrier can be accurately aligned with each other when magnet transfer is performed.

According to the magnetic transfer method of the present invention, during at least the contact step, the magnetic field application step, and the separation step, environmental temperature is controlled in the range of 10 to 60° C. and relative humidity is controlled in the range of 10 to 80 RH %. This control can prevent the occurrence of errors due to a fluctuation in the pattern size and a positional shift. In addition, contamination due to the oxide of the magnetic layer of the master carrier and the dust particles adhering to the slave medium can be prevented and the quality of transferred signals can be enhanced.

In the magnetic transfer method of the present invention, the environmental temperature in the magnetic transfer step is controlled in the range of 10 to 60° C. (preferably 15 to 45° C.).

Because of this, local eccentricity, which occurs in the transfer pattern on the mater carrier and the magnetization pattern recorded to the slave medium, can be prevented and the number of errors due to a difference in pattern size between the master carrier and the slave medium can be reduced. In addition, in the aforementioned environmental temperature range and the aforementioned relative humidity range, the ratio ($\alpha S/\alpha M$) of a thermal linear expansion coefficient ($\alpha M$) for the master carrier and a thermal linear expansion coefficient ($\alpha S$) for the slave medium is in the range of 0.5 to 40. Because of this, a relative size difference between the master carrier and the slave medium due to temperature changes can be reduced and the occurrence of errors can be prevented.

Furthermore, in the magnetic transfer step, the relative humidity is controlled in the range of 10 to 80 RH % (preferably 35 to 70 RH %). Because of this, the oxidization of the magnetic layer of the master carrier and the adhesion of dust particles due to static electricity can be prevented. In addition, the occurrence of contamination is prevented and therefore the number of missing signals can be considerably reduced.

In the aforementioned conveyance step, the number of dust particles (with particle sizes 0.3 $\mu$m or smaller) per cubit feet (=$28.32 \times 10^{-3}$ m$^3$) is 100 or less and the number of dust particles (with particle sizes of 0.5 $\mu$m or larger) is zero. In this case, dust adhesion is further prevented, whereby the number of missing signals can reduced. If electricity is removed from the slave medium before it is brought into intimate contact with the master carrier, and dust particles on the slave medium are removed, then the number of missing signals can be further reduced.

BRIEF DESCRIPTION OF THE DRAWINGS

The present invention will be described in further detail with reference to the accompanying drawings wherein.

DESCRIPTION OF THE PREFERRED EMBODIMENTS

Figure 1:
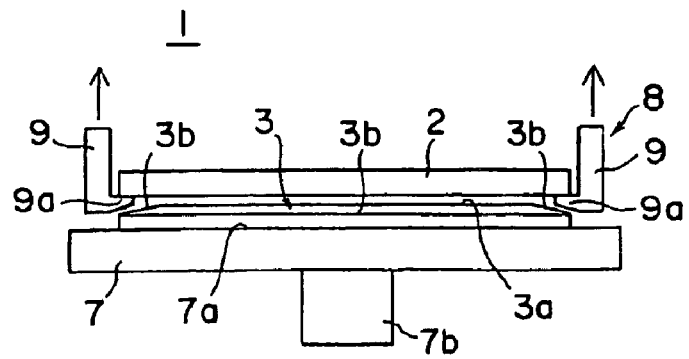
FIG. 1 is a front view showing the slave medium separated state of a magnetic transfer device constructed according to a first embodiment of the present invention.
Figure 2:
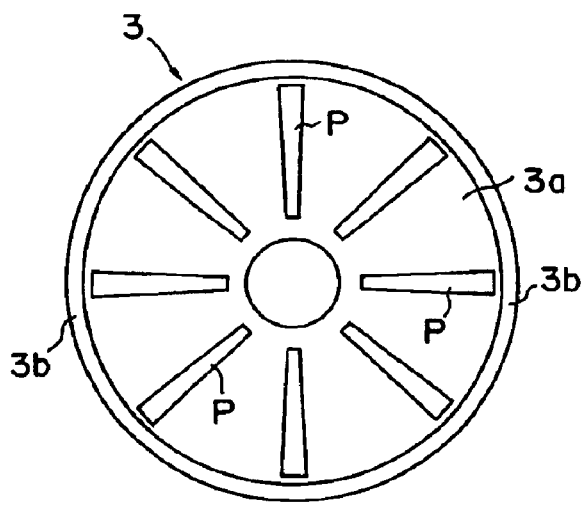
FIG. 2 is a plan view of the master carrier shown in FIG. 1.

Embodiments of the present invention will hereinafter be described in detail. FIG. 1 shows a front view of the slave medium separated state of a magnetic transfer device constructed according to a first embodiment of the present invention. FIG. 2 shows a plan view of the master carrier. Note in the figures that the dimensions of each part are shown at ratios differing from the actual dimensions.

In the magnetic transfer device 1 shown in FIG. 1, the center of one side of a slave medium 2 with a magnetic recording portion that undergoes magnetic transfer is aligned with the center of the information carrying surface 3a of a master carrier 3 having information that corresponds to a servo signal, etc. In this state, they are brought into physical contact with each other. Next, a transfer field is applied to perform magnetic transfer by a magnetic field application device (not shown). The bottom surface of the master carrier 3 is placed on a stationary stage 7, and the slave medium 2 is pressed against the information carrying surface 3a of the master carrier 3 by an upper press member (not shown) through the top surface of the slave medium 2

The magnetic transfer device 1 is equipped with separation means 8 for separating the slave medium 2 being held in intimate contact with the master carrier 3 after magnetic transfer. It is further equipped with press means (not shown) for applying a contacting force to bring the master carrier 3 and the slave medium 2 into intimate contact with each other.

The slave medium 2 uses a disk-shaped magnetic recording medium such as a hard disk having one or two magnetic recording portions (magnetic layer) formed on one side or both sides.

The master carrier 3 in the first embodiment has an inclined face (recess means) 3b formed on the entire circumference of the information carrying surface 3a, as shown in FIG. 2. This master carrier 3 is formed into the shape of a disk, and the information carrying surface 3a is composed of a soft magnetic material coated on a microscopic land/groove pattern formed on the substrate of the master carrier 3. The outside diameter of the master carrier 3 is approximately the same as that of the slave medium 2.

In the case where transfer information is a servo signal, the information carrying surface 3a of the master carrier 3 has a servo pattern P (transfer pattern) consisting of narrow-width regions extending in the radial direction at regular intervals from the center. As mentioned previously, the recess means (inclined face) 3b is formed on the radially outer edge portion of the master carrier 3 outside the servo pattern P and becomes thinner toward the radially outer edge.

The separation means 8 has a plurality of claws 9, the outer end portion 9b of each claw 9 being curved in the center direction of the master carrier 3. Each claw 9 is movable in the center direction so that when the master carrier 3 and the slave medium 2 are brought into intimate contact with each other, the outer end portion 9a is inserted into the gap formed by the recess means (inclined face) 3b of the master carrier 3 and the slave medium 2. The entire separation means 8 is also movable upward. If this separation means 8 is moved upward with the claws 9 inserted in the aforementioned gap, the outer end portion 9a of each claw 9 engages with the slave medium 2 being held in intimate contact with the master carrier 3, and the slave medium 2 is separated from the master carrier 3.

The separation means 8 is provided with one or more claws 9. The aforementioned recess means (inclined face) 3b may be formed only at positions corresponding to the positions of the claws 9 of the separation means 8. The recess means 3b, in addition to the shape of an inclined face, may be formed into the shape of a groove, the shape of a cutout, etc.

The stationary stage 7 is in the form of a disc and has a circular holding surface 7a greater in outside diameter than the master carrier 3. The bottom surface of the master carrier 3 is held on the central portion of the holding surface 7a by suction force. Similarly, the upper press member (not shown) is in the form of a disc and has a pressing surface greater in outside diameter than the slave medium 2. The press member is movable toward and away from the stationery stage 7 in an up-and-down direction and presses the slave medium 2 against the top surface of the master carrier 3. Note that the upper press member may press the slave medium 2 through an elastic sheet member attached to the bottom surface of the upper press member.

The bottom surface of the stationary stage 7 is provided with a rotatable shaft portion 7b. The stationary stage 7 is connected to drive means (not shown) so that it can rotate the slave medium 2 and the master carrier 3 integrally during magnetic transfer.

In the case of in-plane recording, initial DC magnetization is performed on the slave medium 2 so that it is magnetized in an in-plane direction parallel to the slave medium plane. In the case of perpendicular recording, initial DC magnetization is performed on the slave medium 2 so that it is magnetized in a direction perpendicular to the slave medium plane. Next, the slave medium 2 is brought into intimate contact with the master carrier 3, and a transfer field is applied in the opposite direction from the direction of the initializing field to perform magnetic transfer.

The material of the substrate of the master carrier 3 uses nickel (Ni), silicon (Si), quartz, glass, aluminum, alloys, ceramics, synthetic resin, etc. The land/groove pattern on the substrate is formed by a stamper generation method, etc. The formation of the soft magnetic layer on the land/groove pattern is performed by depositing a suitable magnetic material with vacuum film forming means, such as vacuum evaporation, sputtering, ion plating, etc., a plating method, etc. In in-plane recording and perpendicular recording, approximately the same master carriers 3 are used.

In the case of in-plane recording, a magnetic field application device (not shown), for applying an initializing field and a transfer field, is constructed of vertically spaced ring electromagnets. With the vertically spaced ring electromagnets, a transfer field generated in the same direction is applied in a direction parallel to the data track direction. While the stationary stage 7 is being rotated, a transfer field is applied on the slave medium 2 and the master carrier 3. The magnetic field application device may be provided so that it is rotatable. The magnetic field application device may be arranged on one side or both sides. The magnetic field application device in the case of perpendicular recording is constructed of vertically spaced electromagnets or permanent magnets of opposite polarities. The magnetic field application device generates a magnetic field in a direction perpendicular to the slave medium plane and applies it to the slave medium 2 and the master carrier 3.

In the magnetic transfer device 1, magnetic transfer is performed on a plurality of slave mediums 2 through the same master carrier 3. Initially, the master carrier 3 is aligned with the stationary stage 7. With the upper press member (not shown) held away from the stationary stage 7, the center of the slave medium 2 magnetized in the in-plane direction or perpendicular direction is aligned with the center of the master carrier 3. In this state, the upper press member is moved toward the stationary stage 7. With the upper press member, a predetermined force is exerted on the slave medium 2 and the master carrier 3 so that they are brought into intimate contact with each other. Thereafter, the magnetic field application device (not shown) is moved toward the magnetic transfer device 1. The magnetic field application device applies a transfer field in approximately the opposite direction from the direction of the initializing field, while the stationary stage 7 is being rotated. In this manner, a magnetization pattern corresponding to the transfer pattern on the master carrier 3 is transferred and recorded on the magnetic recording portion of the slave medium 2. More specifically, the transfer field applied during magnetic transfer is passed through the land pattern (soft magnetic material) in the transfer pattern of the master carrier 3 being held in intimate contact with the slave medium 2. In the case of in-plane recording, the initial magnetization of the land pattern is not reversed and the initial magnetization in the portion other than the land portion is reversed. In the case of perpendicular recording, the initial magnetization of the land pattern is reversed and the initial magnetization in the portion other than the land portion is not reversed. As a result, a magnetization pattern corresponding to the transfer pattern on the master carrier 3 is transferred and recorded on the slave medium 2.

After magnetic transfer, the press member is moved away from the magnetic transfer device 1. The outer end portions 9a of the claws 9 of the separation means 8 are inserted into the gap between the recess means (inclined face) 3b of the master carrier 3 and the radially outer end portion of the slave medium 2. If the claws 9 engaging with the bottom surface of the radially outer end portion of the slave medium 2 are moved upward, the slave medium 2 is separated from the master carrier 3. The separated slave medium 2 is removed and the next slave medium 2 is aligned with the master carrier 3. Thereafter, magnetic transfer is performed in the aforementioned manner.

According to the first embodiment, the claws 9 of the separation means 9 are engaged with the radially outer end portion of the slave medium 2 after magnetic transfer and are move upward.

In this way, the slave medium 2 can be separated easily and reliably from the master carrier 3 without being scored. Thus, operating efficiency is high and productivity is enhanced.

Figure 3:
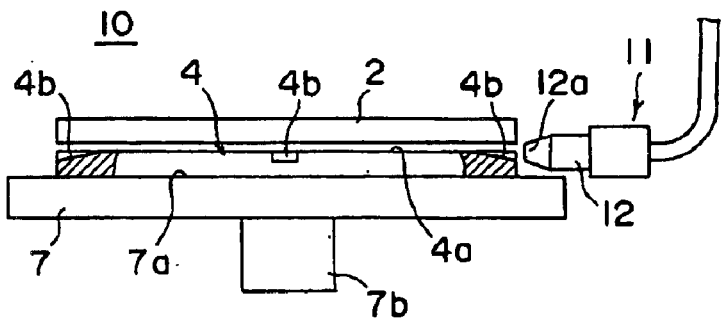
FIG. 3 is a front view showing the slave medium separated state of a magnetic transfer device constructed according to a second embodiment of the present invention.
Figure 4:
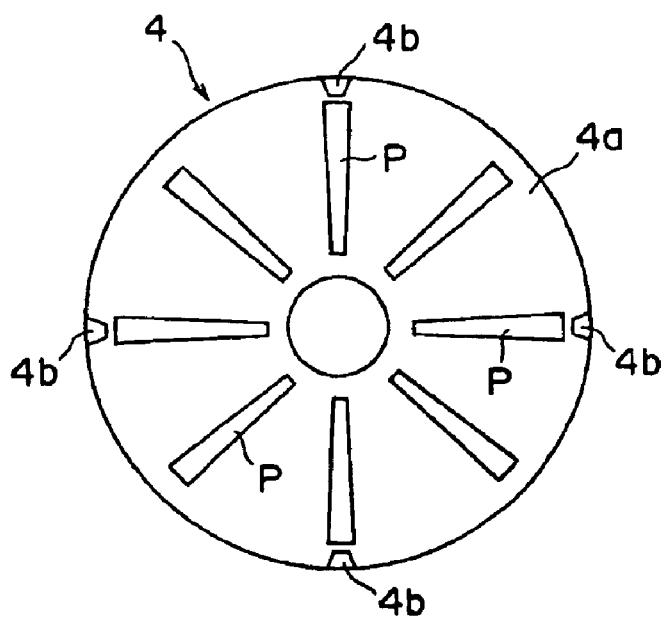
FIG. 4 is a plan view of the master carrier shown in FIG. 3.

FIG. 3 shows a front view of the slave medium separated state of a magnetic transfer device constructed according to a second embodiment of the present invention. FIG. 4 shows a plan view of the master carrier. In the magnetic transfer device 10 of the second embodiment, the shape of the recess means of the master carrier and the separation means differ from those of the first embodiment. The remaining parts are provided the same as the first embodiment, and the same reference numerals are applied to the same parts.

The master carrier 4 in the second embodiment has inclined recesses (recess means) 4b formed at four positions on the radially outer edge of an information carrying surface 4a that makes intimate contact with a slave medium 2, as shown in FIG. 4. The master carrier 4 is formed into the shape of a disk, and the information carrying surface 4a has a serve pattern P (transfer pattern). At four positions on the radially outer edge portion of the master carrier 4 outside the servo pattern P, the inclined recesses (recess means) 4b are formed so that they become thinner toward the radially outer edge.

The separation means 11 in the second embodiment has a plurality of injection nozzles 12 (only one is shown). The outer end portion 12a of each injection nozzle 12 is movable toward the gaps between the recesses (recess means) 4b of the master carrier 4 and the radially outer edge of the slave medium 2 when the master carrier 4 and the slave medium 2 are brought into intimate contact with each other. The injection nozzles 12 are connected to a pressure source so that they can inject compressed gas. If compressed gas is injected from the injection nozzles 12 of the separation means 11 to the recesses (recess means) 4b, the slave medium 2 floats off the master carrier 4 and is separated from the master carrier 4.

The separation means 11 of the second embodiment is provided with one or more injection nozzles 12. The afore- mentioned recess means (inclined recesses) 4b, in addition to the shape of an inclined recess, may be formed into the shape of a groove, the shape of a bore, etc.

Note that the slave medium 2 in the second embodiment, in addition to a hard disk, is able to use a high-density flexible disk.

According to the second embodiment, the injection nozzles 12 of the separation means 11 inject compressed air to the contact surface between the slave medium 2 and the master carrier 4. In this way, the slave medium 2 can be separated easily and reliably from the master carrier 4 without being scored. Thus, operating efficiency is high and productivity is enhanced.

Figure 5:
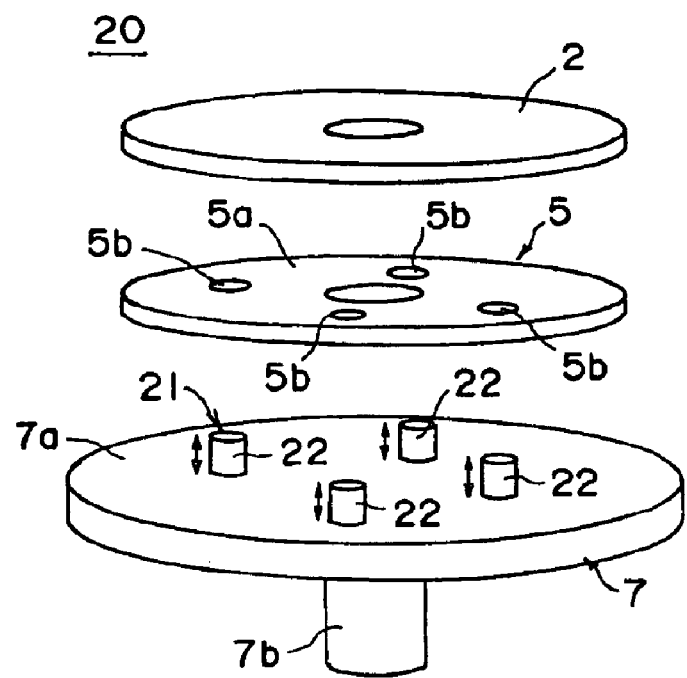
FIG. 5 is an exploded perspective view showing a magnetic transfer device constructed according to a third embodiment of the present invention.
Figure 6:
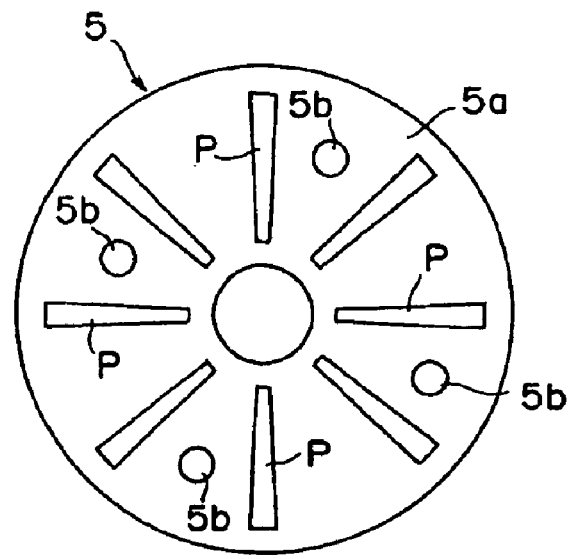
FIG. 6 is a plan view of the master carrier shown in FIG. 5.

FIG. 5 shows a perspective view of a magnetic transfer device constructed according to a third embodiment of the present invention. FIG. 6 shows a plan view of the master carrier. In the magnetic transfer device 20 of the third embodiment, the shape of the recess means of the master carrier and the separation means are different from those of the first embodiment. The remaining parts are provided the same as the first embodiment, and the same reference numerals are applied to the same parts.

The master carrier 5 in the third embodiment has four through bores (recess means) 5b formed in the portion of an information carrying surface 5a in which a servo pattern P (transfer pattern) is not formed, as shown in FIG. 6. The information carrying surface 5a makes intimate contact with a slave medium 2. That is, the master carrier 5 is formed into the shape of a disk, and each through bore (recess means) 5b is formed between two adjacent radial portions in the serve pattern P.

The separation means 21 in the third embodiment has a plurality of pushing-out pins 22. The pushing-out pins 22 are provided on a stationary stage 7 and are connected to drive means (not shown) so that they are slidably inserted into the through bores (recess means) 5b and projected from the top surface of the master carrier 5. During intimate contact, the pushing-out pins 22 are retracted into the through bores (recess means) 5b. After magnetic transfer, the pushing-out pins 22 are projected from the through bores (recess means) 5b, whereby the slave medium 2 is pushed up by the top faces of the pushing-out pins 22 and is separated from the master carrier 5. The separation means 21 is provided with one or more pushing-out pins 22.

According to the third embodiment, the slave medium 2 is pushed up after magnetic transfer by the pushing-out pins 22 of the separation means 21. In this way, the slave medium 2 can be separated easily and reliably from the master carrier 5 without being scored. Thus, operating efficiency is high and productivity is enhanced.

Figure 7:
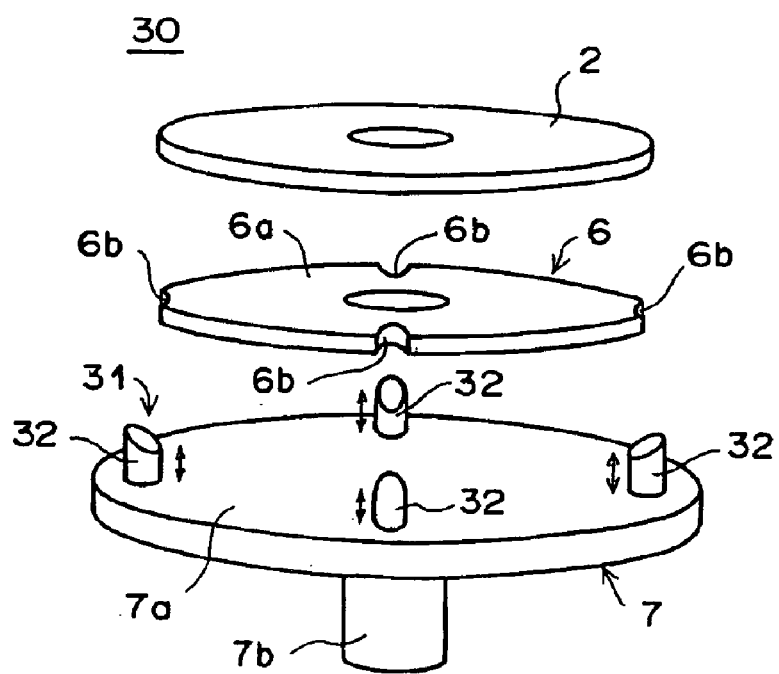
FIG. 7 is an exploded perspective view showing a magnetic transfer device constructed according to a fourth embodiment of the present invention.
Figure 8:
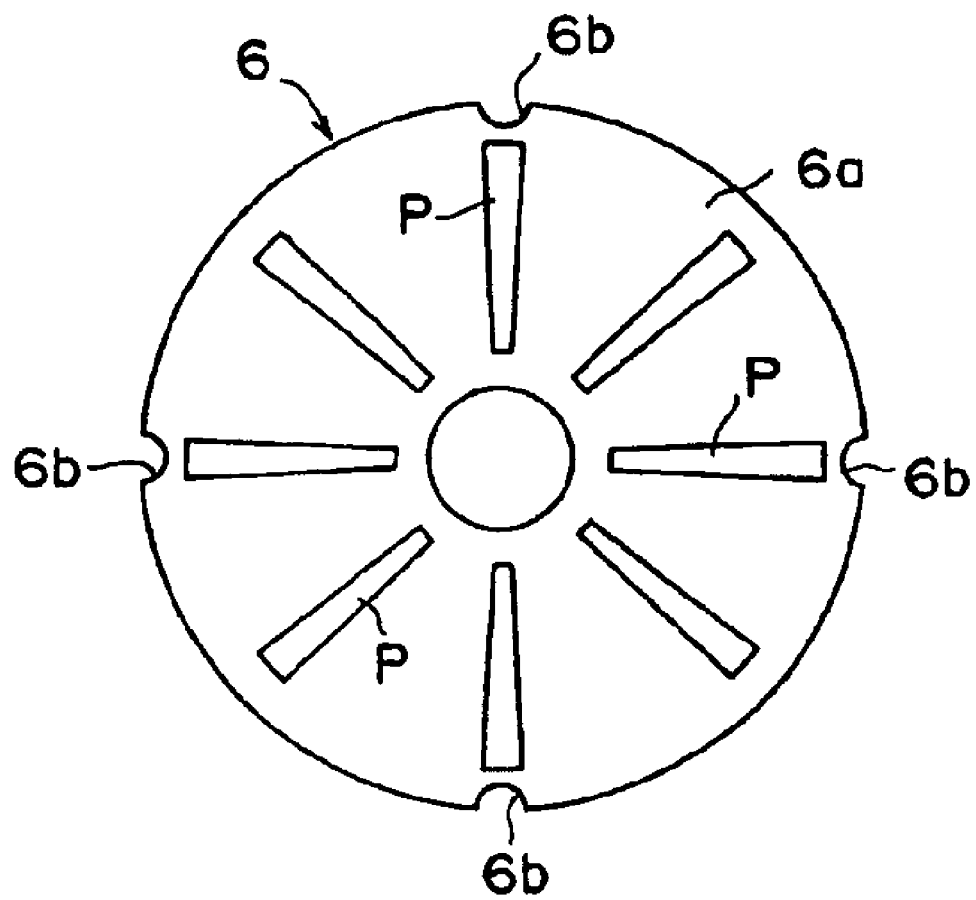
FIG. 8 is a plan view of the master carrier shown in FIG. 7.

FIG. 7 shows a perspective view of a magnetic transfer device constructed according to a fourth embodiment of the present invention. FIG. 8 shows a plan view of the master carrier. In the magnetic transfer device 30 of the third embodiment, the shape of the recess means of the master carrier and the separation means are differentiated from those of the first embodiment. The remaining parts are provided the same as the first embodiment, and the same reference numerals are applied to the same parts.

The master carrier 6 in the fourth embodiment has four semicircular cutouts (recess means) 6b formed in the portion of an information carrying surface 6a in which a servo pattern P (transfer pattern) is not formed, as shown in FIG. 8. The information carrying surface 6b makes intimate contact with a slave medium 2. That is, the master carrier 6 is formed into the shape of a disk, and each semicircular cutout (recess means) 6b is formed in the radially outer edge of the master carrier 6 outside the servo pattern P.

The separation means 31 in the fourth embodiment has a plurality of pushing-out pins 32. The pushing-out pins 32 are provided on the radially outer end portion of a stationary stage 7 and are connected to drive means (not shown) so that they are slidably inserted into the semicircular cutouts (recess means) 5b and projected from the top surface of the master carrier 6. The upper end portion of each pushing-out pin 32 has an inclined face that becomes higher toward the radially outer end, as shown in FIG. 7. That is, the upper end portion of the pushing-out pin 32 abuts only the circumference of the slave medium 2 and does not contact the recording surface of the slave medium 2.

During intimate contact, the pushing-out pins 22 are retracted into the semicircular cutouts (recess means) 6b. After magnetic transfer, the pushing-out pins 32 are projected from the cutouts (recess means) 6b, whereby the radially outer end portion of the slave medium 2 is pushed up by the upper ends of the pushing-out pins 32 and is separated from the master carrier 6. The separation means 31 is provided with one or more pushing-out pins 32.

According to the fourth embodiment, the radially outer end portion of the slave medium 2 is pushed up after magnetic transfer by the pushing-out pins 32 of the separation means 31. In this way, the slave medium 2 can be separated easily and reliably from the master carrier 6 without being scored. Thus, operating efficiency is high and productivity is enhanced.

Figure 9:
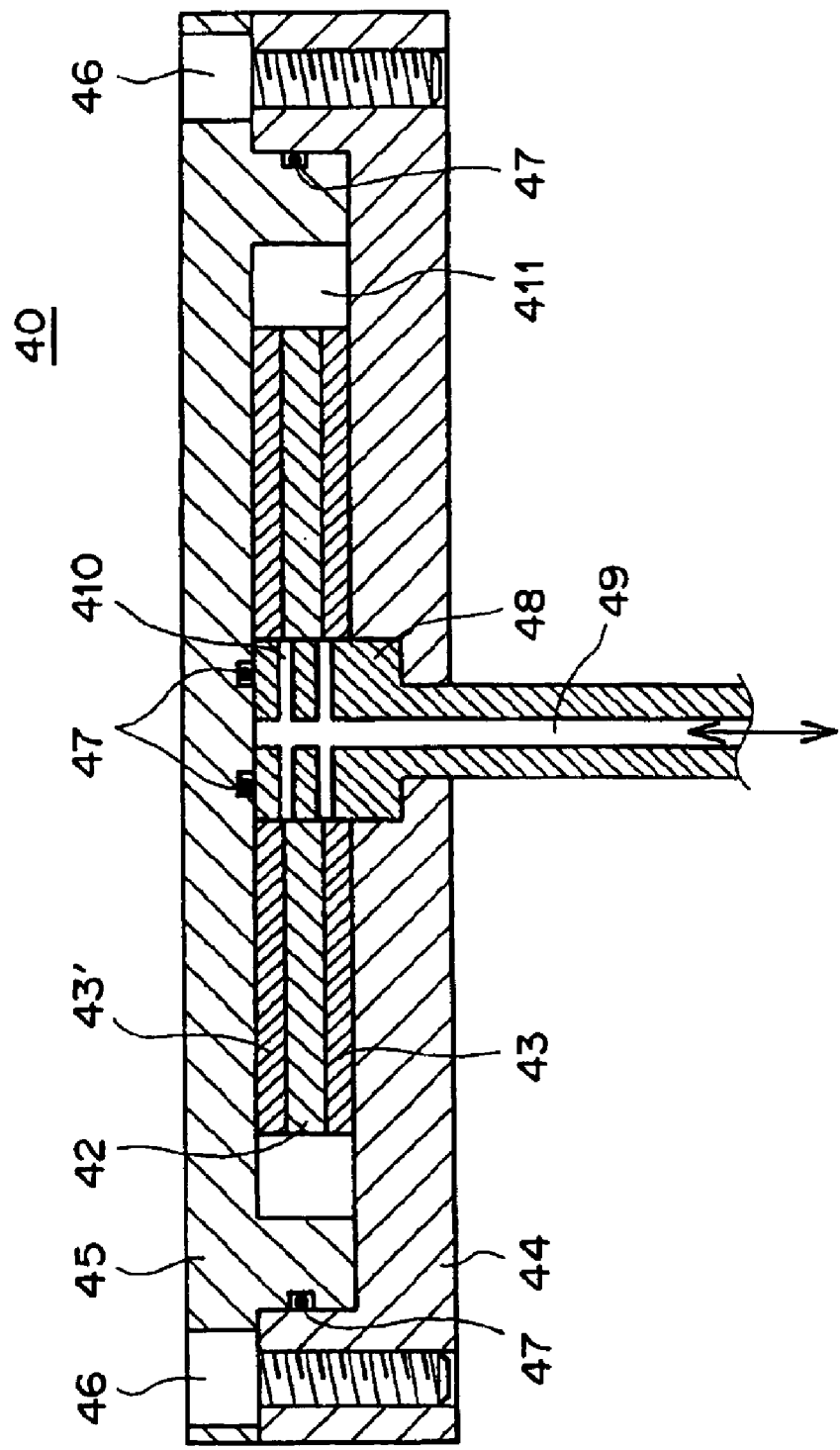
FIG. 9 is a sectional front view showing the holder structure of a magnetic transfer device constructed according to a fifth embodiment of the present invention.

As a modification of the third embodiment, a master carrier 5, which has through bores (recess means) 5b, such as that shown in FIG. 6 can be employed. In this modification, the separation means (not shown) has injection nozzles, which are communicated with the through bores (recess means) 5 band provided on a stationary stage 7. After magnetic transfer, compressed air is introduced to the slave medium 2 through the through bores (recess means) 5b from the injection nozzles. In this manner, the slave medium 2 is separated from the master carrier 5. FIG. 9 shows the holder structure of a magnetic transfer device constructed according to a fifth embodiment of the present invention. Note in the figure that the dimensions of each part are shown at a ratio differing from the actual dimensions.

In the magnetic transfer device 40 shown in FIG. 9, the centers of the slave surfaces of a slave medium 42 with a magnetic recording portion that undergoes magnetic transfer are aligned with the centers of the information carrying surfaces of upper and lower master carriers 43', 43 having information that corresponds to a servo signal, etc. In this state, they are brought into intimate contact with one another. Next, a transfer field is applied to perform magnetic transfer by a magnetic field application device (not shown). The bottom surface of the lower master carrier 43 is held by a lower holder 44, the top surface of the upper master carrier 43' is held by an upper holder 45, and the slave medium 42 is sandwiched between the master carriers 43 and 43'.

Note that the slave medium 42 uses a disk-shaped magnetic recording medium such as a hard disk having one or two magnetic recording portions (magnetic layer) formed on one side or both sides. In addition, the upper and lower holders 44, 45 are integrated into a spigot structure and further fixed with fastening means (bolts, etc.). The contact surface between them is sealed with gaskets 47, etc.

The magnetic transfer device 40 is provided with a center shaft 48, which is inserted into the center holes of the master carriers 43, 43' and slave medium 42 to align them with one another. Within the center shaft 48, there are provided a small-diameter passage 49 in which pressurized air flows, and branch passages 410 communicating with the contact surface between the upper master carrier 43' and the slave medium 42 and the contact surface between the lower master carrier 43 and the slave medium 42. It is preferable that two or more branch passages 410 be provided at equal intervals in the circumferential direction of the center shaft 48.

Figure 10:
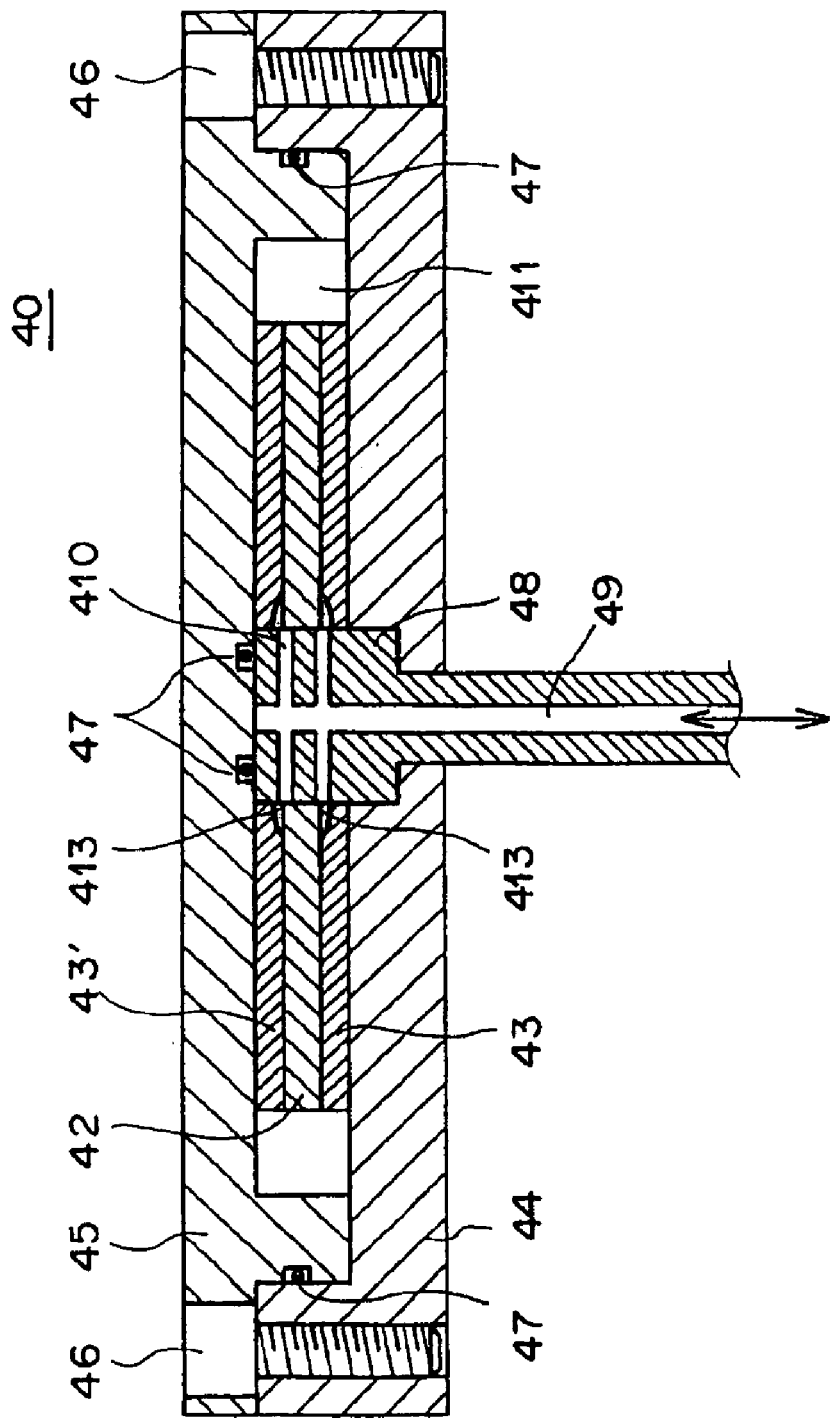
FIG. 10 is a sectional front view showing the holder structure of a magnetic transfer device constructed according to a sixth embodiment of the present invention.
Figure 11:
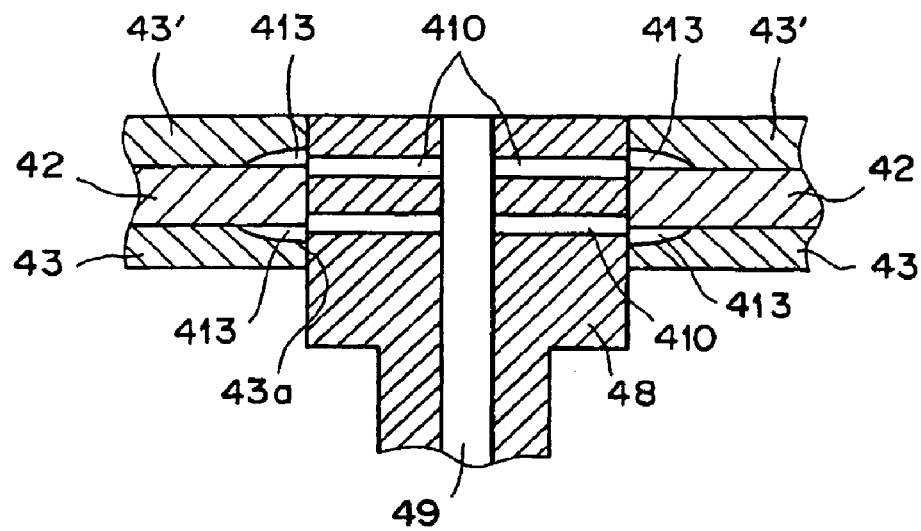
FIG. 11 is an enlarged view of the essential part of the holder structure shown in FIG. 10.
Figure 12:
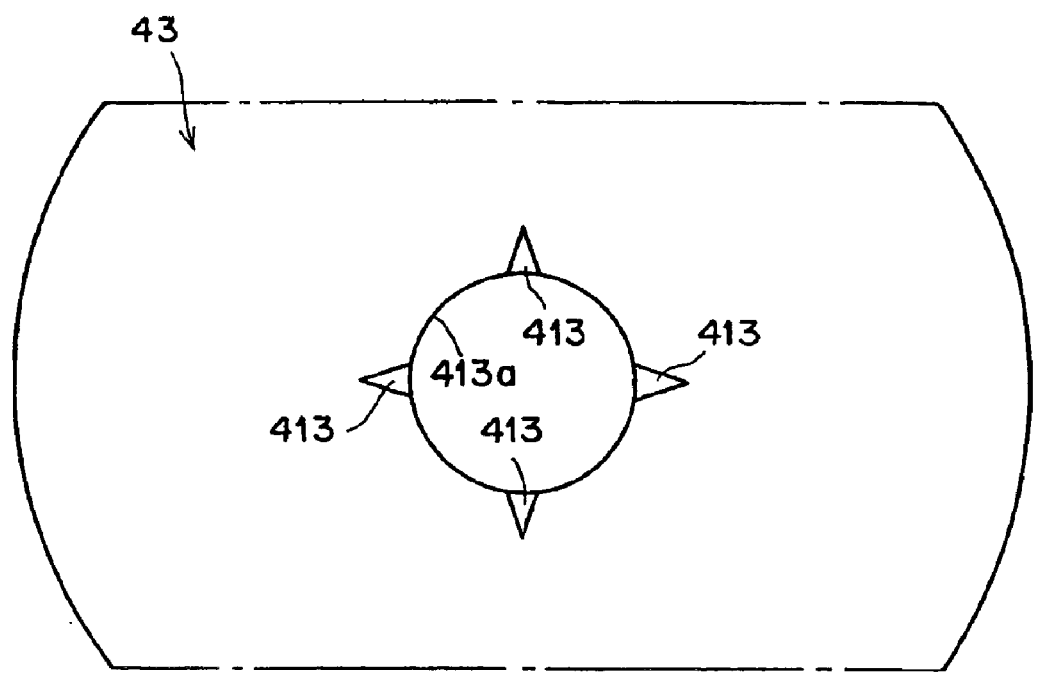
FIG. 12 is a plan view of the master carrier shown in FIG. 10.

As shown in FIGS. 10, 11, and 12, at the inner peripheries of the center holes 43a of the upper and lower master carriers 43' and 43, wedge-type air introducing recesses may be formed in the contact surface between the upper master carrier 43' and the slave medium 42 and the contact surface between the lower master carrier 43 and the slave medium 42. In the illustrated example, four air introducing recesses 413 are formed at equal intervals in opposition to the branch passages 410.

If the master carriers 43, 43' and the slave medium 42 are brought into intimate contact with one another, the radially inner end of the air introducing recess 413 faces the branch passage 410 of the center shaft 48 and the other end extends in wedge form toward the surface of the slave medium 42. Thus, pressurized air can be introduced easily to the contact surfaces between the master carrier 43, 43' and the slave medium 42.

Note that the air introducing recesses 413, in addition to a wedge shape, may be formed into the shape of an inclined face, the shape of a U-groove, etc., so that pressurized air can be introduced easily to the contact surfaces between the master carrier 43, 43' and the slave medium 42. The air introducing recesses 413 are provided at two or more diagonal positions, or at three or more positions equally spaced. In addition, the air introducing recesses 413 are formed in the radially inner region inside a transfer pattern (not shown) or between the radially extending portions of the transfer pattern so that they do not interfere with the transfer pattern. Furthermore, the air introducing recesses 413 may be formed in the entire circumferences of the radially inner portions of the master carrier 43, 43' that make intimate contact with the slave medium 42.

In the case of in-plane recording, initial DC magnetization is performed on the slave medium 42 so that it is magnetized in an in-plane direction parallel to the slave medium plane. In the case of perpendicular recording, initial DC magnetization is performed on the slave medium 2 so that it is magnetized in a direction perpendicular to the slave medium plane. Next, the slave medium 42 is brought into intimate contact with the master carriers 43, 43' and a transfer field is applied in the opposite direction from the direction of the initializing field to perform magnetic transfer. When magnetic transfer is performed, it is preferable that a housing portion 411 be in a vacuum state to enhance the degree of contact between the master carrier 43, 43' and the slave medium 42. To cause the housing portion 411 to be in a vacuum state, the small-diameter passage 49 maybe used, or an additional vacuum discharge bore (not shown) may be provided.

The material of the substrate for the master carriers 43, 43' uses nickel (Ni), silicon (Si), quartz, glass, aluminum, alloys, ceramics, synthetic resin, etc. The land/groove pattern on the substrate is formed by a stamper generation method, etc. The formation of the soft magnetic layer on the land/groove pattern is performed by depositing a suitable magnetic material with vacuum film forming means, such as vacuum evaporation, sputtering, ion plating, etc., a plating method, etc. In in-plane recording and perpendicular recording, approximately the same master carriers 3 are used.

In the case of in-plane recording, the magnetic field application device (not shown), for applying an initializing field and a transfer field, is constructed of vertically spaced ring electromagnets. With the vertically spaced ring electromagnets, a transfer field generated in the same direction is applied in a direction parallel to the data track direction. While the upper and lower holders 44, 45 are being rotated, a transfer field is applied on the slave medium 42 and the master carriers 43, 43'. The magnetic field application device may be provided so that it is rotatable. The magnetic field application device may be constructed of a permanent magnet arranged on one side or two permanent magnets arranged on both sides. The magnetic field application device in the case of perpendicular recording is constructed of vertically spaced electromagnets or permanent magnets of opposite polarities. The magnetic field application device generates a magnetic field in a direction perpendicular to the slave medium plane and applies it on the slave medium 42 and the master carriers 43, 43'. In this manner, magnetization patterns corresponding to transfer patterns on the master carriers 43, 43' are transferred and recorded on both sides of the slave medium 42.

If the housing portion 411 is in a vacuum state after magnetic transfer, the pressure in the housing portion 411 is returned to atmospheric pressure to separate the upper and lower holders 44, 45. As with the aforementioned case, the small-diameter passage 49 can also be used to return the pressure in the housing portion 411 to atmospheric pressure.

Thereafter, pressurized air for separating the slave medium 42 and the master carriers 43, 43' is supplied to the small-diameter passage 49. The pressure is suitably selected, depending on the materials and strength of the slave medium 42 and master carriers 43, 43', contact strength during transfer, etc.

According to the fifth embodiment, the slave medium 42 and the master carriers 43, 43' can be separated easily and reliably without being scored. In addition, in the case of having the air introducing recesses 413, the introduction of pressurized air to the contact surface can be reliably performed and the separating operation is excellent. Thus, operating efficiency is high and productivity is enhanced.

While pressurized air is supplied through the lower holder 44, the present invention is also applicable to the case where pressurized air is supplied through the upper holder 45.

Figure 13:
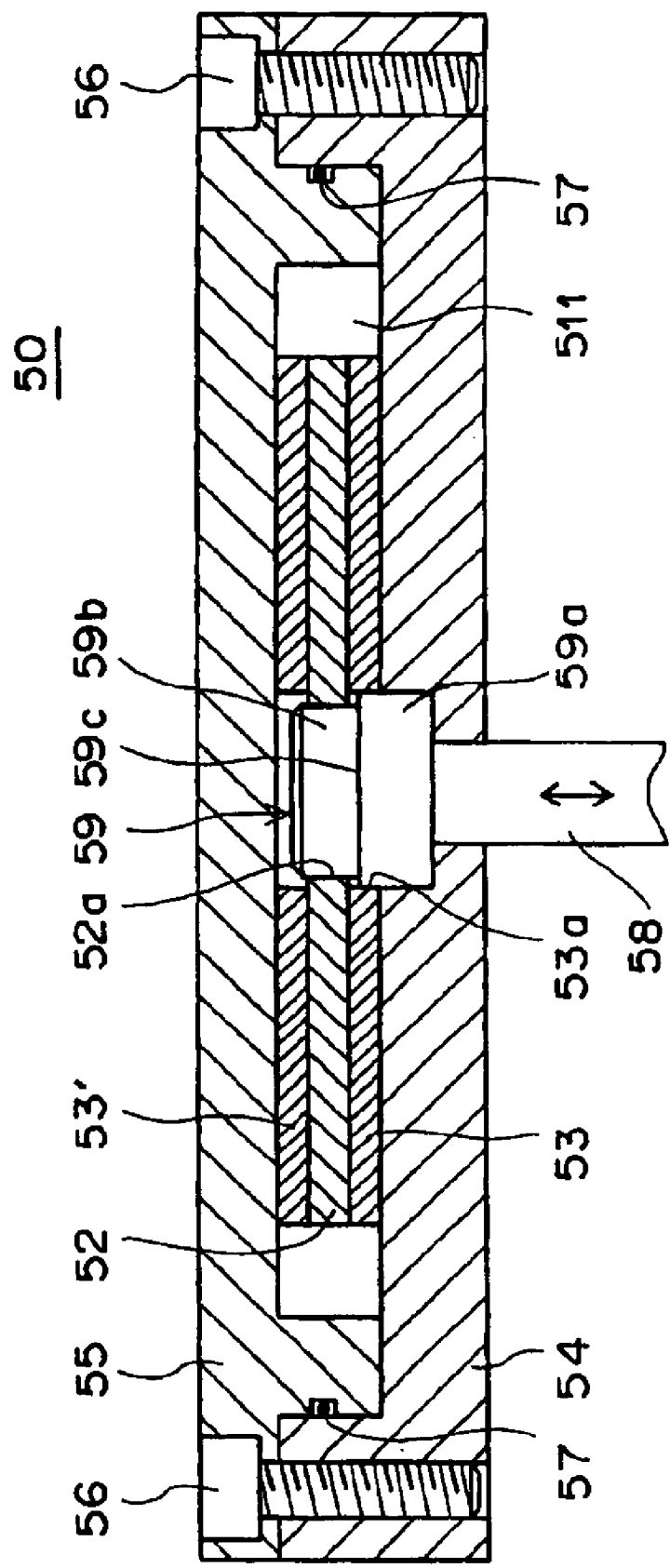
FIG. 13 is a sectional front view showing the holder structure of a magnetic transfer device constructed according to a seventh embodiment of the present invention.
Figure 14:
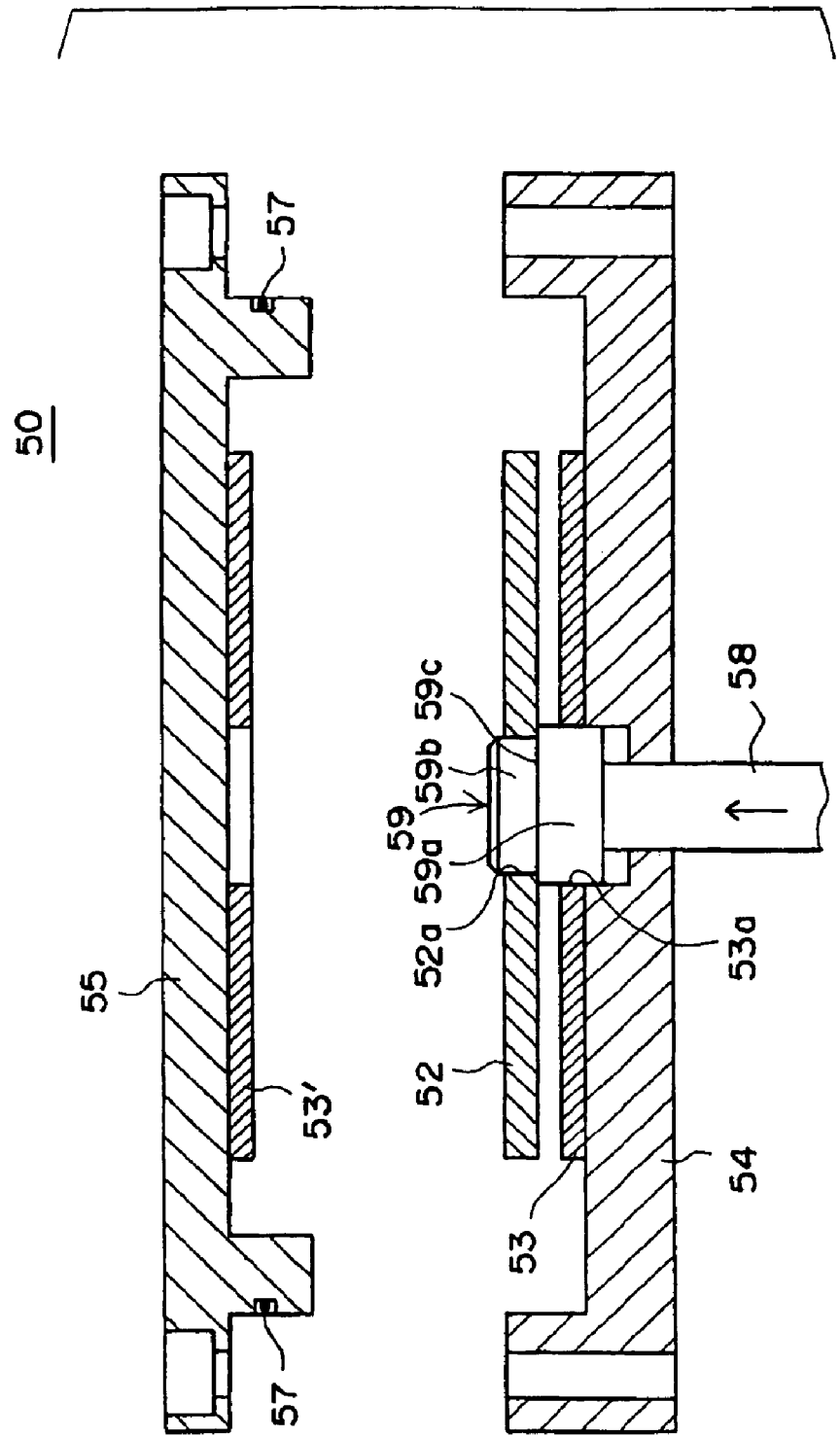
FIG. 14 is a sectional front view of the separated state of the holder shown in FIG. 13.

FIG. 13 shows the holder structure of a magnetic transfer device constructed according to a sixth embodiment of the present invention. FIG. 14 shows the state after the magnetic transfer shown in FIG. 13. Note in the figures that the dimensions of each part are shown at ratios differing from the actual dimensions.

In the magnetic transfer device 50 shown in FIG. 13, the centers of the slave surfaces of a slave medium 52 with a magnetic recording portion that undergoes magnetic transfer are aligned with the centers of the information carrying surfaces of upper and lower master carriers 53', 53 having information that corresponds to a servo signal, etc. In this state, they are brought into intimate contact with one another. Next, a transfer field is applied to perform magnetic transfer by a magnetic field application device (not shown). The bottom surface of the lower master carrier 53 is held by a lower holder 54, the top surface of the upper master carrier 53' is held by an upper holder 55, and the slave medium 52 is sandwiched between the master carriers 53 and 53'. The lower master carrier 53 has a center hole 53a in its central portion.

Note that the slave medium 52 uses a disk-shaped magnetic recording medium, which has one or two magnetic recording portions (magnetic layer) formed on one side or both sides, such as a hard disk, a high-density flexible disk, etc. This slave medium 52 has a center hole 52a smaller in diameter than the center hole 53a of the master carrier 53, in the central portion thereof.

In addition, the upper and lower holders 55, 54 are integrated into a spigot structure and further fixed with fastening means (bolts, etc.). The contact surface between them is sealed with gaskets 57, etc.

The magnetic transfer device 50 is provided with a center shaft 58, which is axially movable and inserted into the central portion of the lower holder 54. The upper end portion of the center shaft 58 is constructed of a separating member 59, which is inserted into the center holes 52a, 53a of the slave medium 52 and the lower master carrier 53 to align them with each other and separate them.

The separating member 59 is equipped with a first shaft portion 59a, a second shaft portion 59b smaller in diameter than the first shaft portion 59a, and a stepped portion 59c between the first shaft portion 59a and the second shaft portion 59b. The separating member 59 is axially movable with respect to the lower holder 54. The first shaft portion 59a engages the center hole 53a of the lower master carrier 53, and the second shaft portion 59b engages the center hole 52a of the slave medium 52. The stepped portion 59c can abut the bottom surface of the circumferential edge of the center hole 52a of the slave medium 52.

During magnetic transfer, as shown in FIG. 13, the center shaft 58 (separating member 59) is at a lowered position, and the stepped portion 59c is at a position lower than the top surface of the lower master carrier 53. The master carriers 53, 53' are held on the inside surfaces of the lower holder 54 and upper holder 55, respectively. The lower master carrier 53 is positioned by engaging the first shaft portion 59a of the separating member 59 with the center hole 53a of the lower master carrier 53. The slave medium 52 is positioned by engaging the second shaft portion 59a with the center hole 52a. With the upper and lower holders 55 and 54 closed, both sides of the slave medium 52 are sandwiched between the master carriers 53, 53'.

Next, a transfer field is applied to perform magnetic transfer. In the case of in-plane recording, initial DC magnetization is performed on the slave medium 52 so that it is magnetized in an in-plane direction parallel to the slave medium plane. In the case of perpendicular recording, initial DC magnetization is performed on the slave medium 52 so that it is magnetized in a direction perpendicular to the slave medium plane. Next, a transfer field is applied in the opposite direction from the direction of the initializing field to perform magnetic transfer. When magnetic transfer is performed, it is preferable that a housing portion 511 be in a vacuum state to enhance the degree of contact between the master carriers 53, 53' and the slave medium 52. To cause the housing portion 511 to be in a vacuum state, a vacuum discharge bore (not shown) is provided. If the housing portion 511 is in a vacuum state after magnetic transfer, the pressure in the housing portion 411 is returned to atmospheric pressure and therefore the upper and lower holders 54, 55 are separated from each other.

After magnetic transfer, as shown in FIG. 4, the upper and lower holders 54, 55 are separated from each other and the center shaft 58 (separating member 59) is moved upward in the axial direction. The upper master carrier 53', along with the upper holder 55, is separated from the top surface of the slave medium 52. On the other hand, the stepped portion 59c of the separating member 59 abuts the bottom surface of the circumferential edge of the center hole 52a of the slave medium 52 and separates the slave medium 52 from the lower master carrier 53. That is, the slave medium 52 is separated from the lower master carrier 53 and held by the stepped portion 59c. Thereafter, the slave medium 52 after magnetic transfer is lifted and removed by the suction cup of conveyance means, an adsorption pad employing Bernoulli's theorem, a mechanical jig, etc.

The material of the substrate for the master carriers 53, 53' uses nickel (Ni), silicon (Si), quartz, glass, aluminum, alloys, ceramics, synthetic resin, etc. The land/groove pattern on the substrate is formed by a stamper generation method, etc. The formation of the soft magnetic layer on the land/groove pattern is performed by depositing a suitable magnetic material with vacuum film forming means, such as vacuum evaporation, sputtering, ion plating, etc., a plating method, etc. In in-plane recording and perpendicular recording, approximately the same master carriers are used.

In the case of in-plane recording, the magnetic field application device (not shown), for applying an initializing field and a transfer field, is constructed of vertically spaced ring electromagnets. With the vertically spaced ring electromagnets, a transfer field generated in the same direction is applied in a direction parallel to the data track direction. While the upper and lower holders 55, 54 are being rotated, a transfer field is applied on the slave medium 52 and the master carriers 53, 53'. The magnetic field application device may be provided so that it is rotatable. The magnetic field application device may be constructed of a permanent magnet arranged on one side or two permanent magnets arranged on both sides. The magnetic field application device in the case of perpendicular recording is constructed of vertically spaced electromagnets or permanent magnets of opposite polarities. The magnetic field application device generates a magnetic field in a direction perpendicular to the slave medium plane and applies it on the slave medium 42 and the master carriers 43, 43'.

According to the sixth embodiment shown in FIGS. 13 and 14, the slave medium 52 and the master carriers 53, 53' can be separated easily and reliably without being scored. In addition, since the slave medium 52 is separated from the master carriers 53, 53' and held, there is no possibility that the slave medium 52 will adhere to the master carrier 53 during conveyance. After magnetic transfer, the slave medium 52 can be easily removed from the magnetic transfer device 50. Thus, operating efficiency is high and productivity is enhanced.

While the separating member 59 is formed integrally with the center shaft 58, it may be formed separately from the center shaft 58. In addition, for the axial movement of the separating member 59, an elastic member may be installed instead of the installation of drive means. In this case, the elastic member is urged in a separating direction. When the slave medium 52 is separated after magnetic transfer, it is urged in the separating direction so that it is separated and held. Furthermore, pressure means may be provided to apply pressurized air to the contact surfaces between the slave medium 52 and the master carriers 53, 53'.

Figure 15:
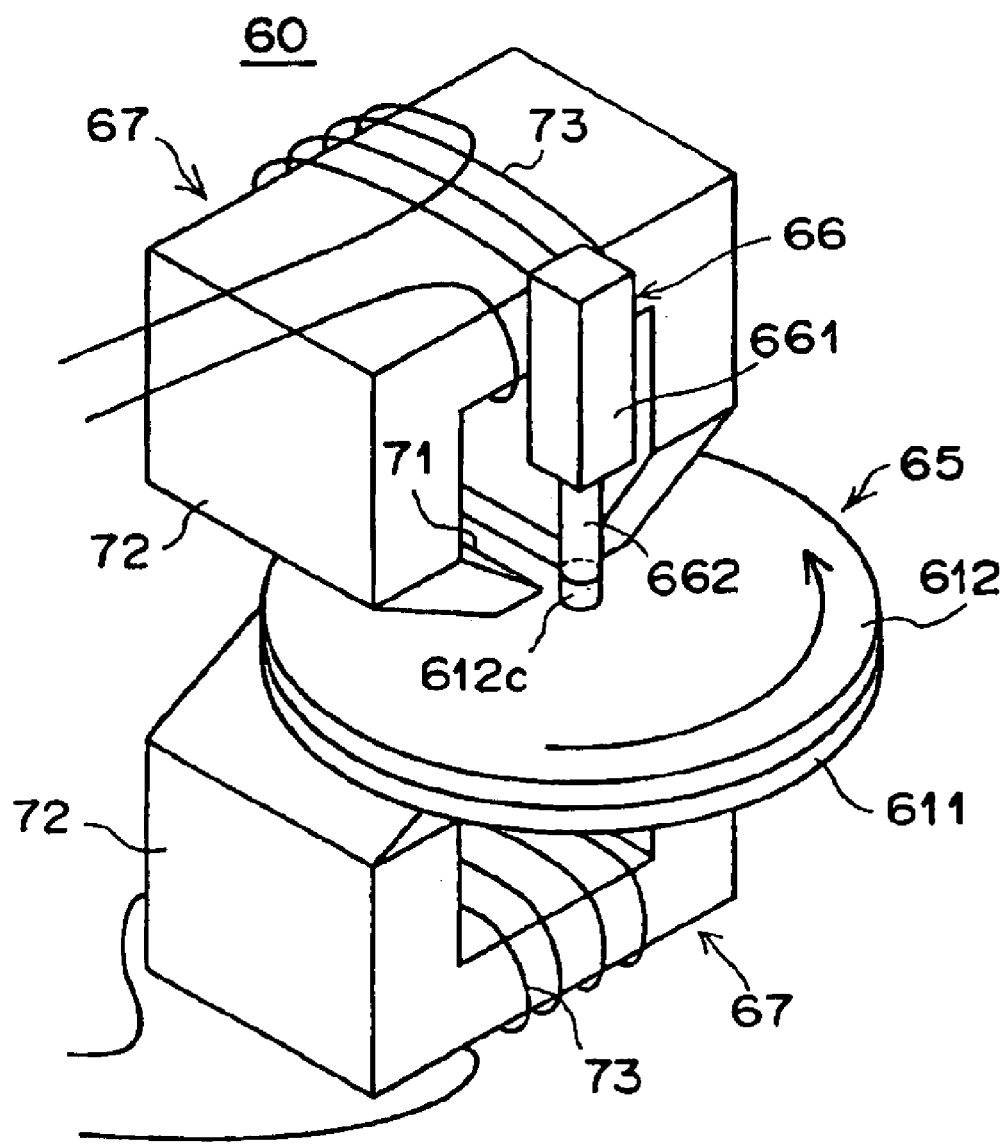
FIG. 15 is a perspective view showing a magnetic transfer device for carrying out a magnetic transfer method according to an eighth embodiment of the present invention.
Figure 16:
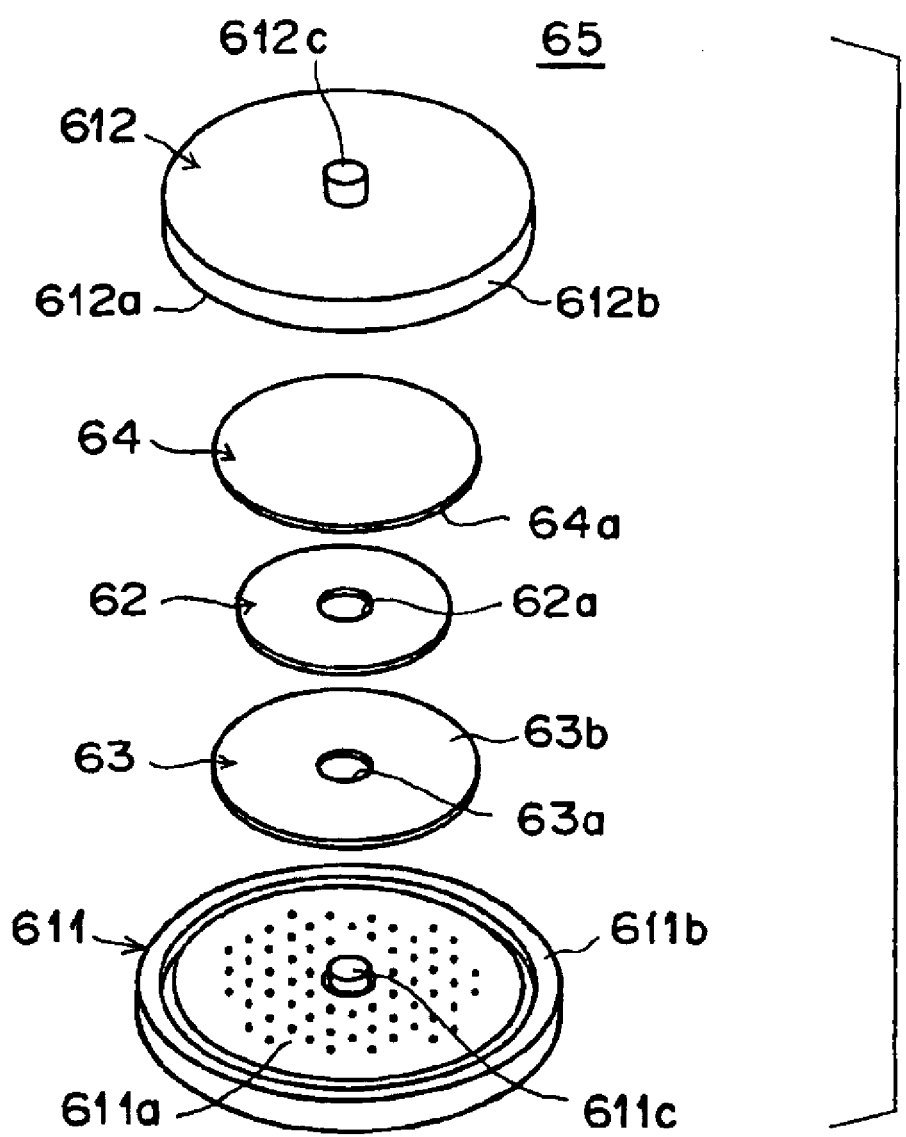
FIG. 16 is an exploded perspective view of the contact device shown in FIG. 15.

A seventh embodiment of the present invention will hereinafter be described. FIG. 15 shows a magnetic transfer device for carrying out a magnetic transfer method. FIG. 16 shows an exploded perspective view of the contact device. FIG. 17 shows a magnetic transfer method according to the seventh embodiment of the present invention. Note in the figures that the dimensions of each part are shown at ratios differing from the actual dimensions.

The magnetic transfer device 60 shown in FIG. 15 is equipped with a lower press member 611 and an upper press member 612. As shown in FIG. 16, the magnetic transfer device 60 is further equipped with a contact device 65, a pressurizer 66 for pressurizing the contact device 65, and a magnetic field application device 67. In the contact device 65, a slave medium 62, a master carrier 63, and an elastic member 64 are arranged with the centers aligned with one another.

The slave medium 62 uses a disk-shaped magnetic recording disk, which has one or two magnetic recording portions (magnetic layer) formed on one side or both sides, such as a hard disk, a high-density flexible disk, etc. This slave medium 62 has a center bore 62a. In the case of in-plane recording, the slave medium 62 is magnetized in an in-plane direction parallel to the slave medium plane. In the case of perpendicular recording, it is magnetized in a direction perpendicular to the slave medium plane. The master carrier 63 is formed into an annular hard disk having a center hole 63a. The information carrying surface 63b of the master carrier 63 having a transfer pattern (magnetic material) is brought into intimate contact with the slave medium 62. On the other hand, the bottom surface of the master carrier 63 is held on the lower press member 611. The elastic member 64 is formed into the shape of a disk from a material that has an elastic characteristic, because it contacts and presses the back surface of the slave medium 62. The elastic member 64 is held on the upper press member 612.

The lower press member 611 of the contact device 65 has an adsorption surface 611a for adsorbing and holding the master carrier 63. The bottom surface of the upper press member 612 is provided with a supporting surface 612a for holding the elastic member 64. The upper press member 612 is axially movable and moved by the pressurizer 66, and they are pressed against each other with a predetermined pressure. When the upper and lower press members 611, 612 are brought into contact with each other, the brim portions 611b, 612b abut each other and the interior is hermetically sealed. The upper and lower press members 611, 612 are connected to drive means and are integrally rotated. The lower press member 611 has a positioning pin 611c at the center thereof.

The pressurizer 66 is equipped with a pressurizing cylinder 661. The lower end of the press rod 662 of the pressurizing cylinder 661 applies a predetermined press load on the upper press member 612. Since the contact device 65 rotates in a pressed state, the pressurizer 66 is arranged so that a pressing force is exerted on the center shaft portion 612c of the upper press member 612. In addition to the pressurizer 66, or instead of the pressurizer 66, the contact between the slave medium 62 and the master carrier 63 may be performed by vacuum suction to enhance contact and realize uniform contact.

In the case of in-plane recording, a magnetic-filed application device 67, for applying an initializing field and a transfer field, is constructed of vertically spaced ring head electromagnets that have a coil 73 wound on a core 72 having a gap 71 which extends in the radial direction of the slave medium 62. With the vertically spaced electromagnets, a transfer field is applied in a direction parallel to the data track direction. While the contact device 65 is being rotated, the generated magnetic field is applied to the slave medium 62 and the master carrier 63. The magnetic field application device 67 may be provided so that it is rotatable. The magnetic field application device 67 may be arranged only on one side. The magnetic field application device 67 may be constructed of a single permanent magnet arranged on one side or two permanent magnets arranged on both sides.

The magnetic field application device 67 in the case of perpendicular recording is constructed of electromagnets or permanent magnets of opposite polarities, which are arranged across the contact device 65. The magnetic field application device 67 generates a magnetic field in a perpendicular direction. When the magnetic field application device 67 applies a magnetic field to a portion of the contact device 65, magnetic transfer is performed on the entire surface by moving either the contact device 65 or the magnetic field.

The magnetic transfer process by the magnetic transfer device 60 includes the step of conveying the slave medium 62, the step of bringing the master carrier 63 and the slave medium 62 into intimate contact with each other, the step of applying a transfer field, the step of separating the master carrier 63 and the slave medium 62 from each other, and the step of removing the slave medium 62 after magnetic transfer.

In the magnetic transfer process, during at least the step of bringing the master carrier 63 and the slave medium 62 into intimate contact with each other, the transfer field application step, and the separation step, the environmental temperature is controlled in the range of 10 to 60° C. (preferably 15 to 45° C.) and the relative humidity in the range of 10 to 80 RH % (preferably 35 to 70 RH %).

It is preferable that in the aforementioned temperature and humidity ranges, the master carrier 63 and the slave medium 62 be formed from a material whose thermal linear expansion ratio ($\alpha S/\alpha M$) of the thermal linear expansion coefficient $\alpha M$ of the master carrier 63 and the thermal linear expansion coefficient $\alpha S$ of the slave medium 62 is in the range of 0.5 to 40.

It is also preferable that in the step of conveying the slave medium 62, the number of dust particles (with particle sizes 0.3 $\mu$m or less) per cubit feet (=28.32×10$^{-3}$m$^3$) be 100 or less and the number of dust particles (with particle sizes of 0.5 $\mu$m or less. Furthermore, it is desirable to remove dust particles on the slave medium 62 and then bring the slave medium 62 into intimate contact with the master carrier 63.

In the magnetic transfer device 60, magnetic transfer is performed on a plurality of slave mediums 62 through the same master carrier 63. Initially, the master carrier 63 and the elastic member 64 are held by the lower press member 611 and the upper press member 612, respectively. With the upper press member 612 and the lower press member 611 moved away from each other, the slave medium 62 magnetized in the in-plane or perpendicular direction is conveyed to the magnetic transfer device 60, and the centers are aligned with each other. Before the conveyance of the slave medium 62 or after the conveyance, dust particles on the slave medium 62 and the master carrier 63 are removed. Next, the pressurizer 66 is driven to move the upper press member 612 toward the lower press member 611. The elastic member 64 is brought into contact with the back surface of the slave medium 62, whereby the slave medium 62 is brought into intimate contact with the master carrier 63. Thereafter, the upper and lower electromagnets of the magnetic field application device 67 are moved toward the top and bottom surfaces of the contact device 65. While the contact device 65 is being rotated, a transfer field is applied in approximately the opposite direction from the direction of the initializing field by the magnetic field application device 67. In this manner, a magnetization pattern corresponding to the transfer pattern on the master carrier 63 is transferred and recorded on the magnetic recording portion of the slave medium 62. After the magnetic transfer, the upper press member 612 is moved away from the lower press member 611. The slave medium 62 is separated from the master carrier 63 and removed. Thereafter, the next slave medium 62 is conveyed and magnetic transfer is repeated in the aforementioned manner.

Figure 17A:
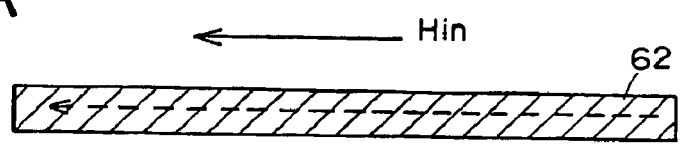
FIGS. 17A to 17C are diagrams showing how magnetic transfer is performed.
Figure 17B:
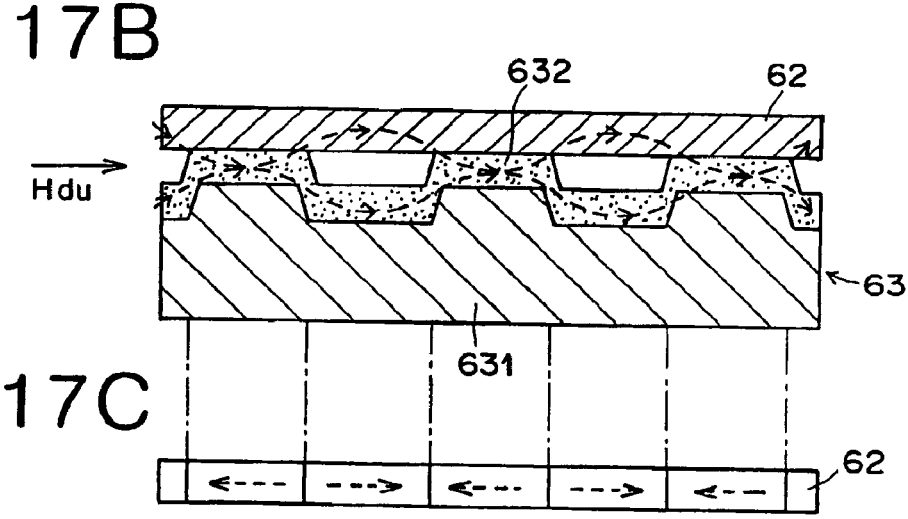
Figure 17C:
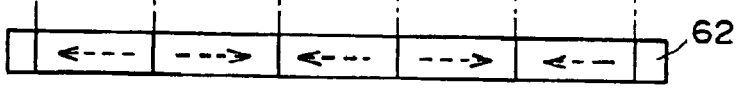

A magnetic transfer method using in-plane recording will be outlined with reference to FIG. 17. As shown in FIG. 17A, an initializing field in is first applied to a slave medium 62 in one direction along the direction of a data track to perform initial magnetization (DC demagnetization). Then, as shown in FIG. 17B, the slave surface (magnetic recording portion) of the slave medium 2, and the top surface of the land portion on an information carrying surface consisting of a soft magnetic layer 632 (magnetic material) coated on a microscope land/groove pattern on the substrate 631 of a master carrier 631, are brought physical contact with each other. In the state of the intimate contact, a transfer field $H_{du}$ is applied in the opposite direction from the direction of the initializing field $H_{in}$ to perform magnetic transfer. The transfer field $H_{du}$ is passed through the soft magnetic layer 632 of the land portion, so that the magnetization of the land portion is not reversed and the magnetization in the portion other than the land portion is reversed. As shown in FIG. 17C, a magnetization pattern, which corresponds to a pattern formed by both the land portion of the soft magnetic layer 632 of the master carrier 63 and the grooves between the lands, is transferred to the slave surface (data track) of the slave medium 62.

As mentioned above, the master carrier 63 has a microscopic land/groove pattern (transfer pattern), corresponding to a servo signal and formed from the soft magnetic layer 32. In the magnetic transfer of the land/groove pattern, there are single-sided serial transfer and double-sided simultaneous transfer. The single-sided serial transfer is performed with the master carrier 63 held in direct contact with one side of the slave medium 62. The double-sided simultaneous transfer is performed with two master carriers 63 held in direct contact with both sides of the slave medium 62.

Note that in the case where the land/groove pattern on the substrate 631 of the master carrier 63 is a negative land/groove pattern opposite the positive land/groove pattern shown in FIG. 17, a similar magnetization pattern can be transferred and recorded by applying the initializing field $H_{in}$ and the transfer field $H_{du}$ in a direction opposite to the aforementioned direction.

In the case where the substrate 631 is composed of a ferromagnetic material such as nickel (Ni), magnetic transfer can be performed without coating the substrate 631 with the soft magnetic layer 632. However, satisfactory magnetic transfer can be performed by providing the soft magnetic layer 632 whose transfer characteristic is good. In the case where the substrate 631 is composed of a nonmagnetic material, it is necessary to provide the soft magnetic layer 632. It is preferable that the soft magnetic layer 32 be provided with a protective coat consisting of diamond-like carbon (DLC), etc. It may be provided with a lubricant layer. It is further preferable that the protective layer consist of a DLC coat of 5 to 30 nm and a lubricant layer. Furthermore, there may be provided a contact reinforcing layer, which is composed of silicon (Si), etc., between the soft magnetic layer 632 and the protective coat. A lubricant improves durability degradation, such as the occurrence of scores due to friction, which occurs in correcting for a shift that occurs when the soft magnetic layer 632 and the slave medium 62 are brought into contact with each other.

The material of the substrate 631 of the master carrier 63 uses nickel (Ni), silicon (Si), quartz, glass, aluminum, alloys, ceramics, synthetic resin, etc. The land/groove pattern on the substrate 631 is formed by a stamper generation method, etc. In the stamper generation method, a photoresist film is first coated on the smooth surface of a glass plate (or a quartz plate) by spinning the glass plate. Then, a laser light beam (or an electron beam) modulated according to a servo signal is irradiated while the glass plate is being rotated. On the entire photo resist film, a predetermined pattern, for example, a pattern extending in the radial direction from the center of rotation and corresponding to a servo signal, is exposed at the portions corresponding to the frames of data tracks. Thereafter, the photoresist film is developed to remove the exposed portions, and an original disk with a land/groove shape consisting of the photoresist film is obtained. Next, based on the land/groove pattern on the surface of the original disk, the surface is plated (or electrotyped), and a nickel (Ni) substrate with a positive land/groove pattern is generated and separated from the original disk. This substrate, as it is, is employed as a master carrier, or the land/groove pattern on the substrate may be coated with a soft magnetic layer and a protective film and employed as a master carrier.

In addition, the aforementioned original disk is plated to generate a second original plate, and by using the second original disk, plating is performed, whereby a substrate with a negative land/groove pattern may be generated. Furthermore, by plating the second original disk or hardening a resin solution applied to the second original, a third original plate is generated, and the third original disk is plated, whereby a substrate with a positive land/groove pattern maybe formed. On the other hand, a photoresist pattern is formed on the glass plate; etching is performed to form grooves in the glass plate; the photoresist is removed to obtain an original disk; and thereafter, a substrate may be formed in the aforementioned manner.

The soft magnetic layer 632 is formed by depositing a suitable magnetic material on the substrate 631 by vacuum film forming means, such as vacuum evaporation, sputtering, ion plating, etc., a plating method, etc. The magnetic material of the soft magnetic layer 632 is able to employ cobalt (Co), alloys with Co (CoNi, CoNiZr, CoNbTaZr, etc.), iron (Fe), alloys with Fe (FeCo, FeCoNi, FeNiMo, FeAlSi, FeAl, FeTaN, etc.), Ni, and alloys with Ni (NiFe, etc.). Particularly, FeCo and FeCoNi are preferred. It is preferable that the thickness of the soft magnetic layer 632 be in the range of 50 to 500 nm. The range of 100 to 400 nm is further preferable.

The master carrier may be formed by generating a resin substrate using the aforementioned original plate, and then providing a soft magnetic layer on the substrate surface. The resin material of the resin substrate is able to use acrylic resin, such as polycarbonate, poly (methyl methacrylate) etc., vinyl chloride resin, such as poly(vinyl chloride), a vinyl chloride copolymer, etc., epoxy resin, amorphous polyolefin, polyester, etc. Polycarbonate is preferable because it has moisture resistance and dimension stability and is low in cost. In the case where there are burrs in molded products, they are removed by varnishing or polishing. In addition, the original disc may be provided with a spin coat or bar coat by using ultraviolet-ray hardened resin, electron-beam hardened resin, etc.

In the case of perpendicular recording, approximately the same master carrier 63 as that of the aforementioned in-plane recording is used. That is, a land/groove pattern is formed on the substrate 631, and the soft magnetic layer 632 (magnetic material) is deposited on the top surface of the land pattern. In the case of the perpendicular recording, initial DC magnetization is performed so that the slave medium 2 is magnetized in one direction perpendicular to the slave medium plane. With the slave medium 62 and the master carrier 63 held in direct contact with each other, a transfer field is applied in the opposite direction from the direction of the initial magnetization direction to perform magnetic transfer. Since the transfer field is passed through the soft magnetic layer 632 of the land portion of the master carrier 63, the perpendicular magnetization of a portion corresponding to the land portion is reversed. In this way, a magnetization pattern corresponding to the land/groove pattern can be recorded on the slave medium 62.

The magnetic recording portion of the slave medium 62 is constructed of a coat type magnetic recording layer or a thin metal film type magnetic recording layer. The material of the magnetic layer of the thin metal film type magnetic recording layer is able to employ cobalt (Co), alloys with Co (CoPtCr, CoCr, CoPtCrTa, CoPtCrNbTa, CoCrB, CoNi, etc.), iron (Fe), and alloys with Fe (FeCo, FePt, FeCoNi, etc.). These magnetic materials are preferable, because they have magnetic anisotropy in the same direction as the direction of an applied magnetic field (in-plane direction in the case of in-plane recording or perpendicular direction in the case of perpendicular recording) and therefore distinct transfer can be performed. It is preferable to provide a base layer of nonmagnetic base under the magnetic material to obtain the required magnetic anisotropy. It is necessary that the crystal structure and lattice constant of the base layer be matched with those of the magnetic layer. For this reason, the base layer employs Cr, CrTi, CoCr, CrTa, CrMo, NiAl, Ru, etc. Note that before it is brought into direct contact with the master carrier 3, the slave medium 2 undergoes the process of removing the microscopic protrusions or dust particles on the surface by a grinding head, a polisher, etc., as occasion demands.

<Experiment Method>

Now, with respect to embodiments and comparative examples of a magnetic transfer method, a description will be given of the results of experiments indicating that it is preferable that environmental conditions be in the aforementioned range. The master carrier, the slave medium, and the evaluation method, used in the experiments, are as follows.

<Master Carrier>

A photoresist (electron beam drawing resist) was coated on a glass plate with a flat surface by a spin coat method. An electron beam was irradiated thereon while the glass plate was rotated, thereby performing exposure thereof. Next, the photoresist was developed and the exposed portions were removed, to form an original disk. Then, a Ni substrate was produced by plating the original disk with Ni and peeling it off from the original disk. In the land/groove pattern of the Ni substrate, radial lines with a width of 2.3 $\mu$m, a line pitch of 2.5 $\mu$m, and a groove depth of 0.2 $\mu$m are arranged from the disk center up to a radial position of 20 to 40 mm, and the pitch between lines is 0.5 $\mu$m at the radially innermost position 20 mm away from the disk center. In the generation of the master carrier, the stamper generation method was employed. On the Ni substrate, a FeCo30at. % soft magnetic layer (a composition is given in atomic percent) was formed at a temperature of 25° C. The Ar sputter pressure was 1.5×10$^{-4}$ Pa (1.08 mTorr) and the applied electric power was 2.80 W/cm$^2$.

<Slave Medium>

In a vacuum film forming device (Shibaura Mechatoronics: S-50S sputter), the pressure was reduced to $1.33 \times 10^{-5}$ Pa ($10^{-7}$ Torr) at room temperature. Then, argon (Ar) was introduced and the pressure was increased to 0.4 Pa ($3 \times 10^{-3}$ Torr). Under these conditions, an aluminum plate was heated to 200° C. and a 3.5" disk-shaped magnetic recording medium (hard disk) with a CrTi layer of thickness 60 nm, a CoCrPt layer of thickness 25 nm, a flux density Ms of 5.7 T (4500 Gauss), and a coercive field $H_{cs}$ of 199 kA/m (2500 Oe) was generated and used as a slave medium.

<Method of Evaluating a Size Fluctuation>

The signals transferred to the slave medium were evaluated by an electromagnetic transformation characteristic measuring apparatus (Kyodo Electronics: SS-60). A magneto resistive (MR) head was used which has a read head gap of 0.19 μm, a read track width of 0.8 μm, a write head gap of 0.4 μm, and a write track width of 1.2 μm. A signal recorded was input to a digital oscilloscope, and the frequency distribution (jitter) of the signal at a zero-crossing point was measured. On the assumption that the frequency distribution follows normal distribution, the values of dispersion σ were calculated and compared. In the case where the value of σ is 8% or less, it is evaluated as good (◯). In the case where the value of σ is in the range of 8 to 10%, it is evaluated as fair (Δ). If it exceeds 10%, it is evaluated as poor (X). The results are listed in Table 1.

<Method of Evaluating Signal Defects>

Magnetic transfer was performed on the slave medium. Thereafter, a magnetic developing solution (Sigma High Chemical: SIG Marker Q) was diluted to 1/10 and dropped on the slave medium. The slave medium was dried and the quantity of shift of the developed signal end was evaluated. The number of missing signals present on the slave medium was randomly observed within a visual field of 100 at a 1:50 magnification ratio by a differential interference microscope. If the number of missing signals within the 100 visual field is 5 or less, it is evaluated as good (◯). In the case of 6 to 9 missing signals, it is evaluated as fair (Δ). In the case of 10 or more missing signals, it is evaluated as poor (X). The results are indicated in Table 1.

[Embodiment 1]

An embodiment 1 is a magnetic transfer method using the aforementioned master carrier and slave medium. The conditions are listed in Table 1. That is, the temperature (room temperature) is 11° C., the humidity (relative humidity) is 13 RH %, and the thermal linear expansion ratio (αS/αM) of the thermal linear expansion coefficient αM of the master carrier and the thermal linear expansion coefficient αS of the slave medium is 1.8. Furthermore, the number of dust particles (with particle sizes 0.3 μm or larger) per cubit feet (=$28.32 \times 10^{-3} m^3$) is 10.

[Embodiments 2 and 3]

An embodiment 2 is the same magnetic transfer method as the embodiment 1, except that the humidity is 52 RH %. An embodiment 3 is the same magnetic transfer method as the embodiment 1, except that the humidity is 76 RH %.

[Embodiments 4 and 5]

An embodiment 4 is the same magnetic transfer method as the embodiment 1, except that the humidity is 15 RH %. An embodiment 5 is the same magnetic transfer method as the embodiment 4, except that the humidity is 56 RH %.

[Embodiments 6 to 8]

An embodiment 6 is the same magnetic transfer method as the embodiment 5, except that the substrate of the slave medium is changed from an aluminum plate to a glass plate and therefore the thermal linear expansion ratio (αS/αM) is 0.7. An embodiment 7 is the same magnetic transfer method as the embodiment 5, except that the substrate of the slave medium is changed to a high-density flexible disk consisting of acetate film and therefore the thermal linear expansion ratio (αS/αM) is 42. An embodiment 8 is the same magnetic transfer method as the embodiment 5, except that the number of dust particles is 152.

[Embodiments 9 to 12]

An embodiment 9 is the same magnetic transfer method as the embodiment 5, except that the humidity is 79 RH %. An embodiment 10 is the same magnetic transfer method as the embodiment 1, except that the temperature is 56° C. and the humidity 18 RH %. An embodiment 11 is the same magnetic transfer method as the embodiment 10, except that the humidity is 61 RH %. An embodiment 12 is the same magnetic transfer method as the embodiment 10, except that the humidity is 73 RH %.

COMPARATIVE EXAMPLES 1 to 6

A comparative example 1 is the same magnetic transfer method as the embodiment 1, except that the humidity is 9 RH %. A comparative example 2 is the same magnetic transfer method as the embodiment 1, except that the humidity is 86 RH %. A comparative example 3 is the same magnetic transfer method as the embodiment 4, except that the humidity is 6 RH %. A comparative example 4 is the same magnetic transfer method as the embodiment 4, except that the humidity is 91 RH %. A comparative example 5 is the same magnetic transfer method as the embodiment 10, except that the humidity is 6 RH %. A comparative example 6 is the same magnetic transfer method as the embodiment 10, except that the humidity is 85 RH %.

COMPARATIVE EXAMPLES 7 to 9

A comparative example 7 is the same magnetic transfer method as the embodiment 1, except that the temperature is 4° C. and the humidity 9 RH %. A comparative example 8 is the same magnetic transfer method as the comparative example 7, except that the humidity is 50 RH %. A comparative example 9 is the same magnetic transfer method as the comparative example 7, except that the humidity is 88 RH %.

COMPARATIVE EXAMPLES 10 to 12

A comparative example 10 is the same magnetic transfer method as the embodiment 1, except that the temperature is 65° C. and the humidity 6 RH %. A comparative example 11 is the same magnetic transfer method as the comparative example 10, except that the humidity is 49 RH %. A comparative example 12 is the same magnetic transfer method as the comparative example 10, except that the humidity is 73 RH %.

<Evaluation Results>

As can be seen from Table 1, in the embodiments 1 to 12, the temperature are 11 to 56° C. and the humidity are 13 to 79 RH %. Since they are in the proper ranges of 10 to 60° C. and 10 to 80 RH %, there is no contamination due to the oxide of the magnetic layer of the master carrier and the dust particles on the slave medium. In addition, the evaluation of the size fluctuation, based on the value of α, and the evaluation of signal defects, based on the number of missing signals, are both good. In the embodiment 7, the thermal linear expansion ratio (αS/αM) of the material of the slave medium is great (42) and therefore the evaluation of the size fluctuation, based on the value a, has been reduced. Judging from this fact, it is preferable that the thermal linear expansion ratio (αS/αM) be 40 or less. In the embodiment 8, the number of dust particles is 152 and dust particles are liable to adhere to the slave medium. The evaluation of signal defects has been reduced. Thus, it is preferable that the number of dust particles be 100 or less.

On the other hand, in the comparative examples 1 to 6, the temperature is in the proper range, but the humidity is outside the proper range. Because of contamination due to the oxide of the magnetic layer of the master carrier, the number of missing signals has been increased and the evaluation of signal defects reduced. In the comparative examples 7 to 12, the temperature is outside the proper range. Because of this, the evaluation of the size fluctuation based on the value of a has been reduced. In the comparative examples 8 and 11, the humidity is in the proper range. Because of this, there is no adhesion of dust particles to the slave medium, and the evaluation of signal defects is good.

TABLE 1

|  | Temp. (° C.) | Humidity (RH %) | αS/αM | Number of dust particles | Value of α | Number of signal defects |
|---|---|---|---|---|---|---|
| Embodiment 1 | 11(good) | 13(good) | 1.8 | 10 | 3(○) | 4(○) |
| Embodiment 2 | 11(good) | 52(good) | 1.8 | 10 | 5(○) | 2(○) |
| Embodiment 3 | 11(good) | 76(good) | 1.8 | 10 | 6(○) | 4(○) |
| Embodiment 4 | 23(good) | 15(good) | 1.8 | 10 | 5(○) | 4(○) |
| Embodiment 5 | 23(good) | 56(good) | 1.8 | 10 | 6(○) | 4(○) |
| Embodiment 6 | 23(good) | 56(good) | 0.7 | 10 | 4(○) | 2(○) |
| Embodiment 7 | 23(good) | 56(good) | 42 | 10 | 9(Δ) | 3(○) |
| Embodiment 8 | 23(good) | 56(good) | 1.8 | 152 | 3(○) | 7(Δ) |
| Embodiment 9 | 23(good) | 79(good) | 1.8 | 10 | 4(○) | 2(○) |
| Embodiment 10 | 56(good) | 18(good) | 1.8 | 10 | 4(○) | 2(○) |
| Embodiment 11 | 56(good) | 61(good) | 1.8 | 10 | 2(○) | 3(○) |
| Embodiment 12 | 56(good) | 73(good) | 1.8 | 10 | 3(○) | 4(○) |
| Comparative example 1 | 11(good) | 9(poor) | 1.8 | 10 | 4(○) | 32(X) |
| Comparative example 2 | 11(good) | 86(poor) | 1.8 | 10 | 2(○) | 19(X) |
| Comparative example 3 | 23(good) | 6(poor) | 1.8 | 10 | 3(○) | 26(X) |
| Comparative example 4 | 23(good) | 91(poor) | 1.8 | 10 | 3(○) | 35(X) |
| Comparative example 5 | 56(good) | 6(poor) | 1.8 | 10 | 4(○) | 44(X) |
| Comparative example 6 | 56(good) | 85(poor) | 1.8 | 10 | 2(○) | 35(X) |
| Comparative example 7 | 4(poor) | 9(poor) | 1.8 | 10 | 13(X) | 42(X) |
| Comparative example 8 | 4(poor) | 50(good) | 1.8 | 10 | 16(X) | 9(Δ) |
| Comparative example 9 | 4(poor) | 88(poor) | 1.8 | 10 | 12(X) | 31(X) |
| Comparative example 10 | 65(poor) | 6(poor) | 1.8 | 10 | 11(X) | 26(X) |
| Comparative example 11 | 65(poor) | 49(good) | 1.8 | 10 | 16(X) | 5(○) |
| Comparative example 12 | 65(poor) | 73(poor) | 1.8 | 10 | 13(X) | 21(X) |

What is claimed is:

1. A magnetic transfer device for bringing a master carrier, which has information and recess means, and a slave medium into intimate contact with each other and then applying a transfer field to transfer said information to said slave medium, said magnetic transfer device comprising:
   separation means for applying external force to said slave medium being held in intimate contact with said master carrier through said recess means formed in said master carrier to separate said slave medium from said master carrier.

2. The magnetic transfer device as set forth in claim 1, wherein
   said recess means of said master carrier comprises an inclined face or inclined faces formed on a radially outer edge of said master carrier, a groove or grooves formed in said radially outer edge, or cutouts formed in said radially outer edge;
   said separation means comprises one or more claws that are inserted into a gap, or gaps, formed by said recess means and said slave medium; and
   said slave medium in intimate contact with said master carrier is separated by lifting said slave medium with said one or more claws.

3. The magnetic transfer device as set forth in claim 1, wherein
   said recess means of said master carrier comprises recesses formed in a radially outer edge of said master carrier, or grooves formed in said radially outer edge;
   said separation means comprises one or more injection nozzles that are inserted into or brought into the vicinity of a gap, or gaps, formed by said recess means and said slave medium; and said slave medium in intimate contact with said master carrier is separated by injecting compressed air into said gap or gaps through said one or more injection nozzles.

4. The magnetic transfer device as set forth in claim 1, wherein
   said recess means of said master carrier comprises through bores or cutouts formed in the portion of said master carrier where a transfer pattern is not formed;

said separation means comprises pins that are inserted into said recess means; and said slave medium in intimate contact with said master carrier is separated by pushing up said slave medium with said pins.

5. The magnetic transfer device as set forth in claim 1, wherein said recess means of said master carrier comprises through bores formed in the portion of said master carrier where a transfer pattern is not formed;

said separation means comprises injection nozzles that are communicated with said through bores; and said slave medium in intimate contact with said master carrier is separated by injecting compressed air into said through bores through said injection nozzles.

6. A magnetic transfer device for bringing a master carrier with information and a slave medium into intimate contact with each other and then applying a transfer field to transfer said information to said slave medium, said magnetic transfer device comprising:

separation means for applying pressurized air to a radially inner contact surface between said master carrier and said slave medium;

wherein said ressurized air is provided from a center hole of said master carrier and a center hole of said slave medium.

7. The magnetic transfer device as set forth in claim 6, wherein said separation means comprises a small-diameter air passage formed in a center shaft which is inserted into the center hole of said master carrier and the center hole of said slave medium, and branch passages extending from said air passage to said radially inner contact surface between said master carrier and said slave medium.

8. The magnetic transfer device as set forth in claim 7, wherein said air passage is used as a vacuum discharge passage for discharging air to bring said master carrier and said slave medium into intimate contact with each other.

9. The magnetic transfer device asset forth in claim 7, wherein said air introducing passages are formed at positions corresponding to said branch passages.

10. A magnetic transfer device for bringing a master carrier with information and a slave medium into intimate contact with each other and then applying a transfer field to transfer said information to said slave medium, said magnetic transfer device comprising:

separation means for applying pressurized air to a radially inner contact surface between said master carrier and said slave medium, wherein said master carrier has air introducing passages formed in its radially inner end portion which makes intimate contact with said slave medium.

11. The magnetic transfer device as set forth in claim 10, wherein said separation means comprises a small-diameter air passage formed in a center shaft which is inserted into a center hole of said master carrier and a center hole of said slave medium, and branch passages extending from said air passage to said radially inner contact surface between said master carrier and said slave medium.

12. The magnetic transfer device as set forth in claim 11, wherein said air passage is used as a vacuum discharge passage for discharging air to bring said master carrier and said slave medium into intimate contact with each other.

13. The magnetic transfer device asset forth in claim 11, wherein said air introducing passages are formed at positions corresponding to said branch passages.

14. The magnetic transfer device asset forth in claim 10, wherein said air introducing passages are formed into the shape of a wedge-shaped recess.

15. A magnetic transfer device for bringing a master carrier with information and a slave medium into intimate contact with each other and holding them in a holder, and then applying a transfer field to transfer said information to said slave medium, said magnetic transfer device comprising:

a separating member, installed in said holder so that it is axially movable, which comprises a first shaft portion engaging with a center hole of said master carrier, a second shaft portion smaller in diameter than the center hole of said master carrier and engaging with a center hole of said slave medium, and a stepped portion formed between said first shaft portion and said second shaft portion;

wherein said separating member is axially moved after magnetic transfer so that said slave medium is separated from said master carrier and held by said stepped portion.

16. The magnetic transfer device asset forth in claim 15, wherein said separating member is constructed with an end portion of a center shaft installed in the center portion of said holder so that it is axially slidable.

17. A magnetic transfer method comprising:

a conveyance step of conveying a slave medium;

a contact step of bring said slave medium and a master carrier into intimate contact with each other;

a magnetic field application step of applying a transfer field to said slave medium and said master carrier being held in intimate contact with each other; and a separation step of separating said master carrier and said slave medium from each other;

wherein during at least said contact step, said application step, and said separation step, environmental temperature is controlled in the range of 10 to 60° C. and relative humidity is controlled in the range of 10 to 80 RH %.

18. The magnetic transfer method as set forth in claim 17, wherein said environmental temperature is controlled in the range of 15 to 45° C. and said relative humidity is controlled in the range of 35 to 70 RH %.

19. The magnetic transfer method asset forth in claim 17, wherein, in said environmental temperature range and said relative humidity range, a ratio ($\alpha S/\alpha M$) of a thermal linear expansion coefficient ($\alpha M$) for said master carrier and a thermal linear expansion coefficient ($\alpha S$) for said slave medium is in the range of 0.5 to 40.

20. The magnetic transfer method asset forth in claim 17, wherein, in said conveyance step, the number of dust particles (with particle sizes 0.3 $\mu$m or larger) per cubit feet (=28.32×10$^{-3}$m$^3$) is 100 or less.

* * * * *